(12) United States Patent
Raguin et al.

(10) Patent No.: US 10,699,097 B2
(45) Date of Patent: Jun. 30, 2020

(54) SYSTEM, METHOD, AND APPARATUS FOR ACQUIRING ROLLED-EQUIVALENT FINGERPRINT IMAGES

(71) Applicant: CROSS MATCH TECHNOLOGIES, INC., Palm Beach Gardens, FL (US)

(72) Inventors: Daniel H. Raguin, North Palm Beach, FL (US); George William McClurg, Jensen Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 83 days.

(21) Appl. No.: 16/132,406

(22) Filed: Sep. 15, 2018

(65) Prior Publication Data

US 2019/0087632 A1    Mar. 21, 2019

Related U.S. Application Data

(60) Provisional application No. 62/559,439, filed on Sep. 15, 2017.

(51) Int. Cl.
*G06K 9/00* (2006.01)
*G06K 9/20* (2006.01)

(52) U.S. Cl.
CPC ..... *G06K 9/00026* (2013.01); *G06K 9/00087* (2013.01); *G06K 9/00919* (2013.01); *G06K 9/209* (2013.01); *G06K 2009/0006* (2013.01)

(58) Field of Classification Search
CPC ........... G06K 9/00053; G06K 9/00912; G06K 9/00026; G06K 9/00919; G06K 9/209; G06K 9/00087; G06K 2009/0006
See application file for complete search history.

(56) References Cited

U.S. PATENT DOCUMENTS 5,818,956 A     10/1998  Tuli
5,895,871 A *    4/1999  Patton ................ A61B 5/04005
                                                                  73/866.5

(Continued)

FOREIGN PATENT DOCUMENTS

WO         2019070391         4/2019

OTHER PUBLICATIONS

G. Overton, "Isorg and FlexEnable win award for flexible biometric image sensor on plastic", Laser Focus World, Jul. 19, 2017, printout from http://www.laserfocusworld.com/articles/2017/07/isorg-and-flexenable-win-award-for-flexible-biometric-image-sensor-on-plastic.html.

(Continued)

*Primary Examiner* — Premal R Patel
(74) *Attorney, Agent, or Firm* — Schwegman Lundberg & Woessner, P.A.

(57) ABSTRACT

Biometric detection of a fingerprint is provided by a flexible sensor, in which one or more positioning members move at least a portion of the sensor to conform to a shape of a finger disposed along the sensor to enable capture of a rolled-equivalent fingerprint for the finger. Such one or more positioning members move the sensor causing it to curl at least along a region extending between right and left sides of a fingernail of the finger around a front of the finger in order to conform the sensor to the finger so that the sensing elements of the sensor when enabled capture images of the rolled-equivalent fingerprints without rotation or rocking of the finger with respect to the sensor. When sensing elements are optically sensitive, one or more light sources may provide light to illuminate the finger when the sensor captures rolled-equivalent fingerprint images.

31 Claims, 12 Drawing Sheets

(56) References Cited

U.S. PATENT DOCUMENTS

| | | | |
|---|---|---|---|
| 5,991,467 | A | 11/1999 | Kamiko |
| 6,687,391 | B1 | 2/2004 | Scott et al. |
| 7,277,562 | B2 | 10/2007 | Zyzdryn |
| 7,315,070 | B2 | 1/2008 | Okada et al. |
| 7,403,644 | B2 | 7/2008 | Bohn et al. |
| 7,601,123 | B2 | 10/2009 | Tweed et al. |
| 7,671,976 | B2 | 3/2010 | Sherman |
| 9,245,167 | B2 | 1/2016 | Carver et al. |
| 9,536,129 | B2 | 1/2017 | Carver et al. |
| 9,792,516 | B2 | 10/2017 | Vogel et al. |
| 9,893,102 | B2 | 2/2018 | Raguin et al. |
| 9,898,140 | B2 | 2/2018 | Tallal et al. |
| 10,024,655 | B2 | 7/2018 | Raguin et al. |
| 2005/0089204 | A1* | 4/2005 | Carver ............... G06K 9/00046 382/127 |
| 2007/0279617 | A1* | 12/2007 | Sherman ............. G06K 9/0004 356/71 |
| 2008/0069412 | A1 | 3/2008 | Champagne et al. |
| 2012/0237092 | A1 | 9/2012 | Bechtel |
| 2015/0130698 | A1* | 5/2015 | Burgess ................. G06F 1/163 345/156 |
| 2016/0253542 | A1 | 9/2016 | Lee et al. |
| 2017/0086741 | A1* | 3/2017 | Bly ...................... A61B 5/6826 |
| 2018/0253588 | A1* | 9/2018 | Aronoff-Spencer ......................... G06K 9/00087 |
| 2018/0260603 | A1* | 9/2018 | Aronoff-Spencer ......................... G06K 9/0002 |

OTHER PUBLICATIONS

NEXT Biometrics Group ASA, "NEXT Biometrics Introduces a new generation of sensors for Power-Focused Smart Card and battery driven markets", May 31, 2016, printout from: http://nextbiometrics.com/newsroom/next_news/2016/next_biometrics_introduces_a_new_generation_of_sensors_for_power_focused_smart_card_and_battery_driven_markets/.

NEXT Biometrics Group ASA, downloaded from nextbiometrics.com, next_biometrics_company_presentation_april2016.pdf, Apr. 2016.

FlexEnable Limited, "Biometrics", printout from https://www.flexenable.com/Applications/Biometrics/, Sep. 15, 2017.

FlexEnable Limited, "Flexible fingerprint sensors", printout from https://web.archive.org/web/20170907010800/http://www.flexenable.com:80/technology/flexible-fingerprint-sensors, Sep. 7, 2017.

"International Application Serial No. PCT/US2018/051258, International Search Report dated Apr. 8, 2019", 3 pgs.

"International Application Serial No. PCT/US2018/051258, Written Opinion dated Apr. 8, 2019", 5 pgs.

* cited by examiner

FIG. 9A
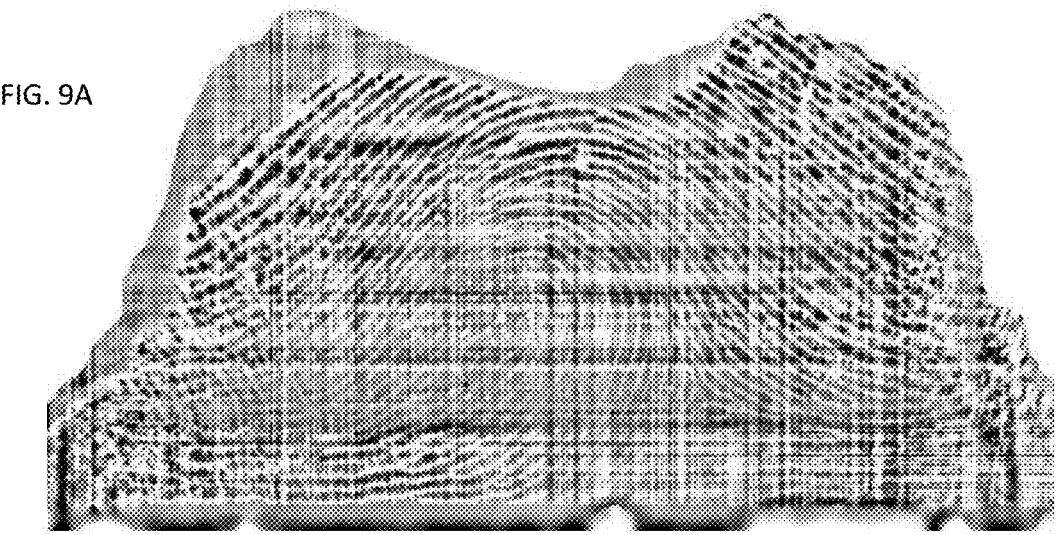
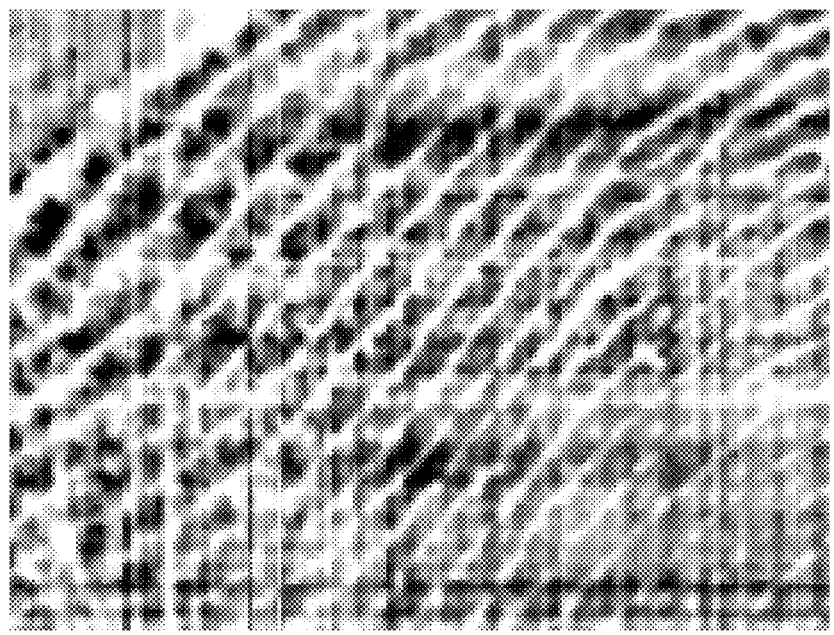
FIG. 9B

SYSTEM, METHOD, AND APPARATUS FOR ACQUIRING ROLLED-EQUIVALENT FINGERPRINT IMAGES

This application claims priority to U.S. Provisional Patent Application No. 62/559,439, filed Sep. 15, 2017, which is incorporated herein by reference.

FIELD OF THE INVENTION

The present invention relates to a system, method, and apparatus for acquiring rolled-equivalent fingerprint images, such images being equivalent to a fingerprint captured by the traditional method of a subject rolling or rocking his or her fingers to form a rolled fingerprint. The present invention uses a sensor, which is flexible, so that one or more positioning members can move the sensor to curl or wrap along a region extending between right and left sides of a fingernail of a finger to acquire rolled-equivalent fingerprint images, rather than using a conventional flat, rigid fingerprint scanner platen. As such, the present invention requires no rolling or rocking of a subject's finger to obtain fingerprint images that are equivalent to a traditionally rolled fingerprint by ink upon a fingerprint record card.

BACKGROUND ON THE INVENTION

Law enforcement officials, as is typical practice when booking a criminal, capture rolled fingerprints and not just flat fingerprints. Rolled fingerprints are advantageous because the latent fingerprints left at a crime scene are not necessarily from the flat part of the finger, but could be from the sides of the finger. Rolled prints, because of their larger area, also have more minutia than flat prints, so in theory when matching a rolled print to the rolled print of the same finger, the matching accuracies should be higher. The downside is that rolled fingerprint acquisition using a conventional fingerprint scanner currently requires a trained officer to hold both the finger and the hand of a subject, and then to rotate both of them while the finger is touching the rigid platen of the fingerprint scanner. Since capturing good quality rolled fingerprints currently requires a trained officer to work with the subject, this is a labor-intensive process and typically not implemented for non-criminal biometric applications. Even with a trained operator, there is the risk of the finger sliding or skin in the finger bunching up and then releasing during a roll which can cause artifacts in the captured rolled print. Software in the fingerprint scanner must take individual images of the finger as it is rolling across the rigid platen surface and then electronically stitch these images together in order to arrive at a final rolled fingerprint image. Consequently, the frame rate of the present fingerprint scanners must be high enough to accommodate the speed at which a finger might be rolled across the platen surface.

U.S. Pat. No. 5,991,467 to Kamiko describes an image sensor with a flexible substrate which, while deforming along the shape of a finger to finger pressure, does not deform to capture a rolled-equivalent fingerprint that extends to (at or proximate to) right and left sides of a fingernail of the finger around a front of the finger, referred to herein as a nail-to-nail fingerprint. Further, even if such sensor were so flexible, mere pressure alone does not guarantee that the sensor would be properly positioned along the finger to enable capture of a rolled-equivalent fingerprint image. Accordingly, it would be desirable to provide a system, method, and apparatus for capturing rolled-equivalent fingerprint images with a flexible sensor alleviating the need for a trained operator, and simplifies the image processing that the current method of acquiring a rolled fingerprint images requires using a rigid platen fingerprint scanner.

SUMMARY OF THE INVENTION

Accordingly, it is an object of the present invention to provide a system, method, and apparatus for biometric detection of rolled-equivalent fingerprint images using a flexible sensor, where the term "rolled-equivalent fingerprint image" is defined as an image captured by the flexible sensor not produced by rolling or rocking a finger to capture a complete nail-to-nail fingerprint image as performed by the prior art either by ink on media, or electronically by stitching multiple captured fingerprint images of different parts of the finger as a finger is rolled or rocked along a rigid platen fingerprint scanner.

It is another object of the present invention to provide a system, method, and apparatus for biometric detection using a flexible sensor and a mechanism having one or more positioning members which move to conform the sensor to the shape of a finger in order to capture rolled-equivalent fingerprint images, wherein the finger is presented to the sensor and placed in contact or near contact with the sensor so that sensing elements of the sensor face the finger and can capture complete single nail-to-nail fingerprint image(s) equivalent to a typical rolled fingerprint.

Briefly described, the present invention embodies a system having a flexible sensor and one or more positioning members that move at least a portion of the sensor to conform to a shape of the finger in order to dispose the finger along the sensor to enable capture of a rolled-equivalent fingerprint for the finger using the sensor.

The sensor has a two-dimensional (2D) array of sensing elements (sensor pixels) for capturing one or more two-dimensional images, such as of the rolled-equivalent fingerprint. The sensing elements are disposed within upper and lower flexible substrates of the sensor enabling the sensor to move in response to one or more positioning members. Preferably, the sensor pixels are in a rectilinear arrangement where within each pixel is an area that is sensitive to one or more of optical, heat, pressure, capacitive, resistive, or impedance signals measured from an object that is touching or facing the sensor.

One or more processors of a processor module are provided in the system to control the sensor for capturing images. The one or more processors may optionally obtain finger location information prior to the sensor conforming to the finger. Such finger location information may be obtained by capturing one or more images from the sensor prior to conforming the sensor to the finger, and processing such images in order to determine when the finger is positioned properly with respect to the sensor for capture of image(s) of the rolled-equivalent fingerprint when the sensor conforms to the shape of the finger. Also, one or more finger position sensors may be present providing finger location information to the one or more processors to determine when the finger is positioned properly with respect to the sensor. Such one or more finger position sensors when used may have an optical beam break system consisting of a light source and at least one detector, or an optical or ultrasonic distance measuring device. When the finger is determined not to be in a correct position with respect to the sensor, graphical or audio feedback is provided by the system to the subject to move his or her finger to the correct position. The feedback may be outputted via a display or audio speaker in the system, such as by using a computer in communication with the one or more processors.

One or more optional locking members may be provided which prevent movement of the one more positioning members until the finger is determined positioned properly with respect to the sensor. Such one or more locking members operate responsive to the one or more processors to engage the one more positioning members to prevent movement of the one or more positioning members, and to release the one or more positioning members and enable operation thereof when the finger is positioned properly with respect to the sensor.

The one or more positioning members are part of a conforming enclosure mechanism which moves at least a portion of the sensor so that it curls or wraps along the finger extending to (i.e., at or proximate to) both right and left sides of a fingernail of the finger to partially enclose the sensor around the finger from a front thereof, thereby presenting the finger to the sensor to enable capture of a rolled-equivalent fingerprint by the sensor without rotation or rocking of the finger with respect to the sensor. Such one or more positioning members may represent one of opposing arms which inwardly rotate the flexible sensor towards the finger between the arms, or a flexible carrier, such as comprising hinged links, which moves to partially enclose the sensor around the finger, or an expandable bladder which moves to partially enclose the sensor around the finger. In the case of a bladder, such bladder may be hydraulically or pneumatically expandable.

When the sensing elements of the flexible sensor are optical sensing elements, the system may further comprise one or more light sources, such as multiple LEDs, providing light to the finger which is sensitive to the sensor. The one or more light sources may be disposed over the finger, so that the finger is between the sensor and the one or more light sources, to enable light from the one or more light sources to transmit through the finger toward the sensor to illuminate the finger when the sensor captures image(s). Alternatively, one or more light sources may be provided below the sensor where at least a portion of the light can pass through the sensor to the finger, or such light sources may be integrated into the flexible sensor itself.

The present invention further embodies a method for biometric detection of a fingerprint comprising the steps of: positioning one or more members to move at least a portion of a flexible sensor to conform to a shape of a finger; and capturing a rolled-equivalent fingerprint for the finger using the sensor. The positioning step may position such one or more members to curl the sensor along the finger in order to dispose the sensor along at least a region extending to right and left sides of a fingernail of the finger around a front of the finger in order to conform the sensor to the shape of the finger along at least the region when the capturing step is carried out.

Further, an apparatus for biometric detection of a fingerprint is provided having a flexible sensor, means for positioning the sensor to conform to the shape of a finger along at least a region extending to right and left sides of a fingernail of the finger around a front of the finger, and one or more processors to control the sensor to capture one or more images of a fingerprint of the finger along the region where the fingerprint is more than the width captured by pressing the finger onto a flat and rigid sensor platen. The one or more images captured may represent a rolled-equivalent fingerprint for the finger.

The system, apparatus, and method of the present invention may be implemented for one or more fingers simultaneously, where such fingers may include thumbs, by providing a flexible sensor and associated conforming enclosure mechanism for each of the fingers. Further, it is understood that although the finger is being described herein as being pressed downward, that a downward is not necessarily relative to the direction of gravity. Rather a downward direction is meant to convey that the finger is being pressed or moved towards the upper surface of the sensor.

BRIEF DESCRIPTION OF THE DRAWINGS

The foregoing and other objects, features, and advantages of the invention will become more apparent from a reading of the following description in connection with the accompanying drawings in which:

FIG. 3B shows the mechanism having moved the sensor into a position, with movement of the finger downward into a nail to nail imaging position from that shown in FIG. 3A, to partially enclose the sensor around the finger in order for the sensor to capture rolled-equivalent fingerprint images of the finger;

FIG. 5B shows the mechanism having moved the sensor responsive to an actuating motor into a nail to nail imaging position from that shown in FIG. 5A to partially enclose the sensor around the finger in order for the sensor to capture rolled-equivalent fingerprint images of the finger;

FIG. 5D shows the mechanism having moved the sensor into a position responsive to an actuating motor into a nail to nail imaging position from that shown in FIG. 5C to partially enclose the sensor around the finger in order for the sensor to capture rolled-equivalent fingerprint images of the finger;

FIG. 7C shows the mechanism after expansion of the bladder having moved the sensor into a nail to nail imaging position by partially enclosing the sensor around the finger in order for the sensor to capture rolled-equivalent fingerprint images of the finger;

FIG. 8C shows the mechanism having moved the sensor into a nail to nail imaging position by partially enclosing the sensor around the finger in order for the sensor to capture a rolled-equivalent fingerprint images of the finger using illumination from the light sources disposed above the finger;

FIG. 9A is an example of a rolled-equivalent fingerprint image captured with the system of FIG. 1 using the sensor and first embodiment mechanism as shown in FIG. 8C; and FIG. 9B is magnified view of the upper left portion of the fingerprint image of FIG. 9A.

DETAILED DESCRIPTION OF THE INVENTION

Figure 1:
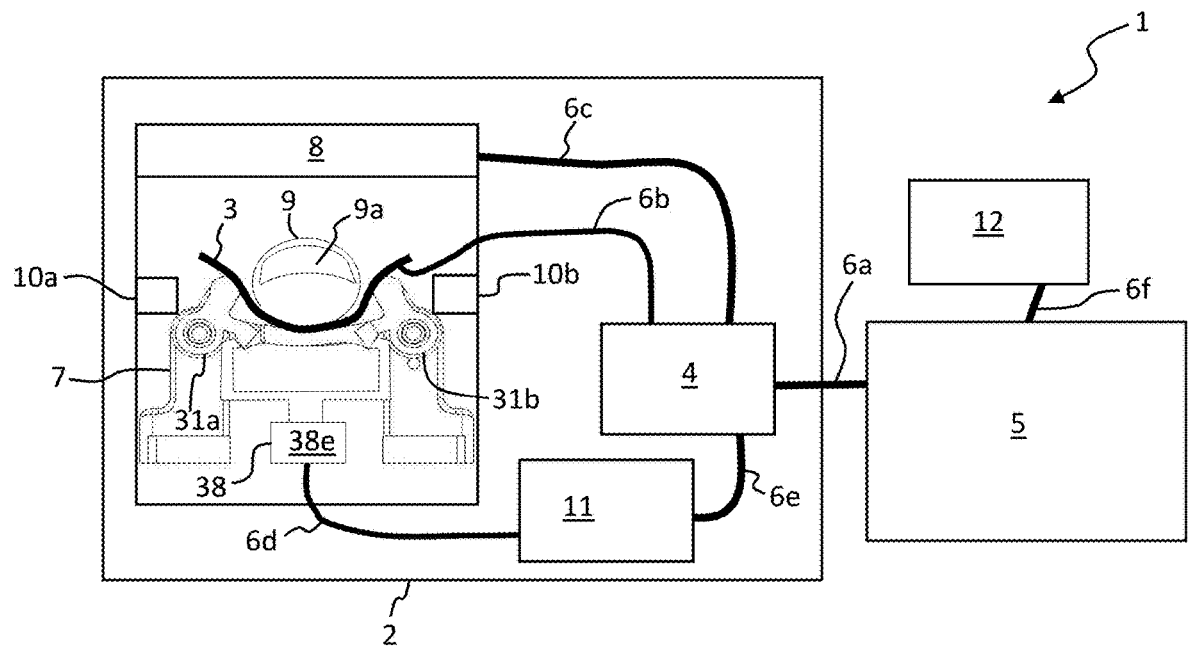
FIG. 1 is a block diagram of the system of the present invention with an example finger, where a mechanism of a first embodiment for positioning the finger with respect to the flexible sensor is shown.
Figure 3A:
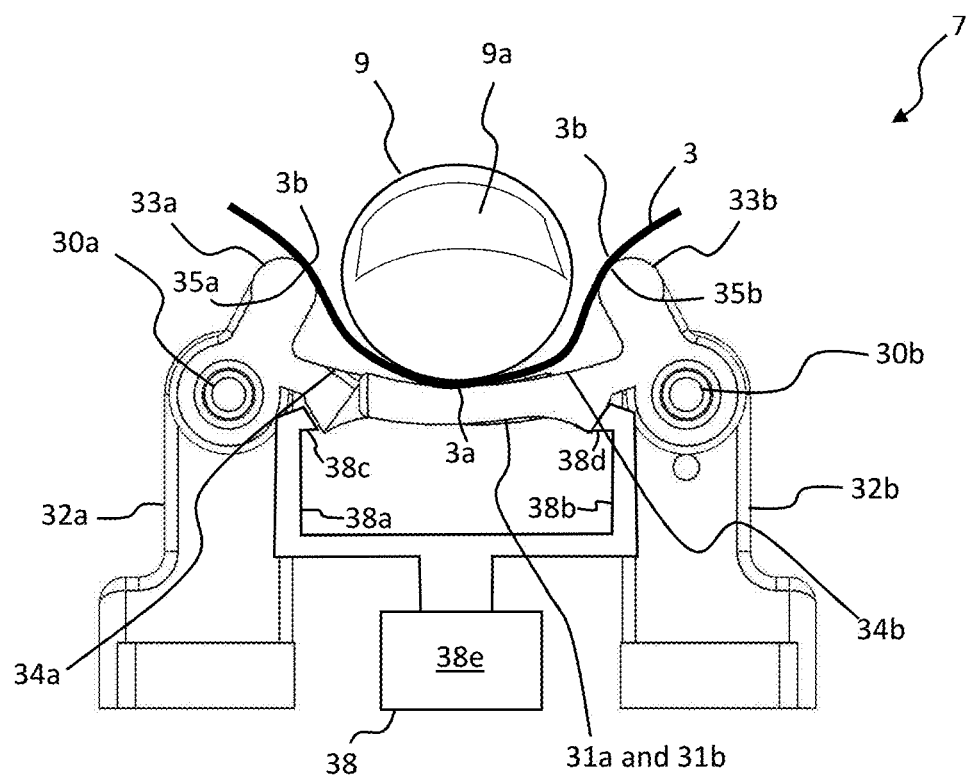
FIGS. 3A and 3B are side views of a mechanism of a first embodiment for positioning an example finger with respect to the flexible sensor in the system of FIG. 1 using two inwardly rotating arms, where FIG. 3A show the initial placement of the finger with respect to the mechanism.
Figure 3B:
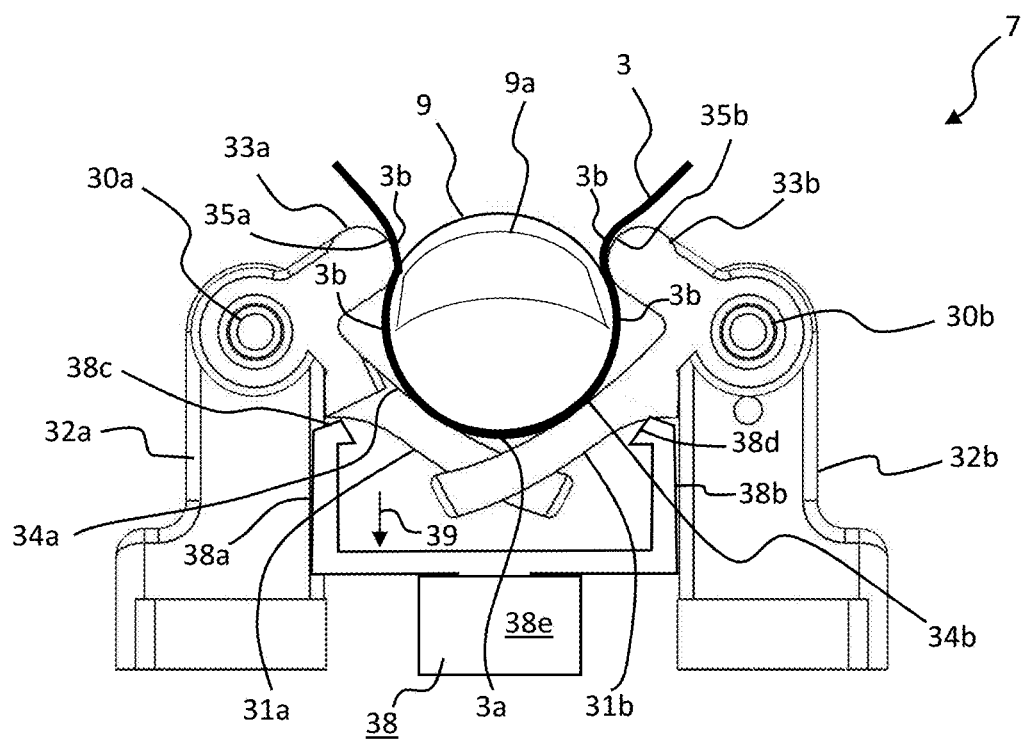

Referring to FIG. 1, a block diagram of system 1 of the present invention is shown having a flexible sensor 3 disposed along a conforming enclosure mechanism 7 having one or more positioning members. For purposes of illustration, mechanism 7 of FIGS. 3A-B is shown in FIG. 1 where the one or more positioning members are inwardly rotating arms 31a and 31b, but different ones of mechanism 7 of FIGS. 5A-C or 7A-C may be provided in system 1 with different positioning member(s). As will be described later below in connection with FIGS. 3A-B, 5A-C, and 7A-C, the one or more positioning members mechanism 7 operate to move sensor 3 so that it bends by curling to conforms the sensor 3 along the shape of a finger 9 at least along a region of the finger 9 between right and left sides of a fingernail 9a of the finger 9 (preferably nail-to-nail), thus partially enclosing sensor 3 around finger 9 from a front thereof. The sensor 3 is connected, via a cable 6b, to a processor module 4 which is then connected to a computer 5, via a cable 6a (or wirelessly). The processor module 4 controls sensor 3 for capturing images from the sensor 3 of finger 9 when presented to the sensor. Computer 5 may be a typical computer system providing a user-interface (e.g., a software program with a graphical user interface (GUI) upon a display monitor 12, keyboard and/or mouse) that may further process images from flexible sensor 3 received from the processor module 4. Display monitor 12 may be, for example, a liquid crystal or an organic light emitting diode (OLED) display, connected to computer 5, but other types of displays may be used. The components of system 1 are contained in a housing 2 in which mechanism 7 is disposed along the housing for receiving finger 9. The computer 5 may be contained within housing 2 or not.

The conforming enclosure mechanism 7 may use a downward force of pressure of finger 9 upon the flexible sensor 3 or, as will described below, forces generated by optional motors, pneumatics and or fluid mechanics for the purposes of ensuring that the sensor 3 conforms around finger 9 of a human subject. While a single finger 9 is referred to herein, finger 9 can represent any one or more fingers of a subject, including the thumb. Further, multiple different fingers may be presented to different ones of system 1 at the same time, where each of the different fingers is presented to a different one of sensor 3 and mechanism 7 for the conforming to the shape thereof to obtain rolled-equivalent fingerprint images of such different fingers. If needed, a conform control module 11 may be connected to the mechanism 7 to enable or disable an optional releasably locking mechanism 38 (if present) of the one or more positioning members of mechanism 7, and/or to operate any means of mechanism 7 for enabling forces to conform the sensor 3, where such conforming of the sensor 3 is achieved at least partially by forces not generated by the subject's finger 9. Within conform control module 11 are the necessary electronics, operative responsive to processor module 4, via a cable 6d, to activate and control devices, such as a motor 53 (FIGS. 5A-C) or valve 74 and pump 76 (FIGS. 7A-C), providing the non-subject dependent forces required within mechanism 7 to conform the sensor 3 to the finger 9 of the subject. For purposes of illustration in FIG. 1, conform control module 11 is shown connected to locking mechanism 38 of arms 31a and 31b, via cable 6d, however other ones of mechanism 7 of FIGS. 5A-C or FIG. 7A-C also operate using signals from conform control module 11, as described later below.

Flexible sensor 3 comprises a two-dimensional (2D) array of sensor pixel (or pixel sensing elements), preferably in a rectilinear arrangement where within each pixel is an area that is sensitive to one or more of optical, heat, pressure, capacitive, resistive, or impedance signals measured from an object that is touching or facing the sensor. For the purposes of high-quality fingerprint image capturing and matching, it is preferred that the sensor array has a pixel center-to-center separation of 50.8 µm or less, thereby corresponding to an electronic scanning resolution of 500 pixels per inch (ppi) or better. Sensors which may be used to provide flexible sensor 3 are available from ISORG of Grenoble, France, or NEXT Biometrics of Oslo, Norway, which use thin-film transistors (TFTs), but other fingerprint sensors having flexible substrates may be used which can conform at least along a region to obtain a nail-to-nail fingerprint. ISORG, for example, manufactures 500 ppi optical sensors that are based upon TFTs that are printed onto a flexible polymer backplane. NEXT Biometrics also manufactures TFT sensors on flexible substrates, and their sensors measure thermal fluctuations of an object in contact with their sensors.

Processor module 4 control the operation of system 1 and of flexible sensor 3 thereof in accordance with specification of the sensor manufacturer. Processor module 4 may process all or some of the data (e.g., one or more two-dimensional images) received from the sensor 3, such as of image(s) representative of a rolled-equivalent fingerprint for finger 9 as shown for example in FIG. 9A. Computer 5 may provide processing of data received from processor module 4. Processor module 4 is of an electronic type and may contain one or more data processors (or chips), such as a central processing unit (CPU), an ARM (Advanced RISC Machine) processor, a digital signal processor (DSP), or a field programmable gate array (FPGA), or other programmable logic device, operating in accordance with software or program. Memory may be provided in the one or more processors of module 4, or in housing 2 accessible by such one or more processors, for storing such software or program.

Optionally, an illumination system 8 may be connected to processor module 4, via cable 6c, in the case of flexible sensor 3 that relies at least partly upon optical illumination to produce an image of a scanned finger. This illumination system preferentially operates at a set of wavelengths that the sensor 3 is sensitive to and which human tissue is reasonably transparent to. Preferably, illumination system 8 has one or more light sources, such as set of light emitting diodes (LEDs) that emit within the wavelength range of 750 to 950 nm. By way of example, a linear array of 850 nm LEDs may be used above the finger 9 as light sources, where each 850 nm LED may be a LED Model No. SMBB850N-1100 available from USHIO OPTO Semiconductors, Inc. (formally Epitex) of Japan. Since light from illumination system 8 is positioned above finger 9, the light must transmit and scatter through the finger 9 until the light rays emerges from the fingerprint. In areas where the fingerprint ridges of the fingerprint are touching the sensor 3, the sensor 3 will detect a stronger optical signal than from areas of the sensor the fingerprint valley are above and thus be able to capture an image representative of finger 9. A spectral filter may be provided when the sensor 3 has sensing elements that operates with light. Such spectral filter blocks out undesirable wavelengths of light, such as UV through green light that are absorbed by the skin and do not travel through the tissue of the finger 9. This spectral filter may be integrated into the sensor 3 itself or placed above the finger 9, between the finger 9 and the light sources of illumination system 8.

While illumination system 8 is shown entirely above finger 9 in FIG. 1, its one or more light sources need only be positioned over finger 9 to provide illumination for proper sensor 3 operation. For example, the one or more light sources of illumination system 8 may be fixed in position with respect to housing 2, or such one or more light sources 8a (FIGS. 8A-C) may be mechanically coupled with one of the position members to move therewith to orient such light source(s) above finger 9. Alternatively, one or more light sources may be provided below, rather than above, the sensor 3 and finger 9, in which at least a portion of the light can pass through the sensor 3 to the finger 9. In a further alternative, light sources may be integrated into the sensor itself by the sensor 3 manufacturer, reducing or avoiding the need for illumination system 8.

Finger 9 is illustrated in FIG. 1 as touching the flexible sensor 3, but touching of the sensor may or may not be required to initiate operation of the conforming enclosure mechanism 7 conforming sensor 3 to finger 9. Optionally, finger position detection modules 10a and 10b are provided in system 1 to provide finger location information to processor module 4 prior to operation of the sensor 3 to capture a fingerprint. The processor module 4 can then communicate with computer 5 to provide feedback to the subject until his or her finger 9 is in the correct position with respect to sensor 3 (e.g., finger 9 presents sensor 3 in its proper position with or without touching upon sensor 3), so that when mechanism 7 operates the sensor 3 active sensing area of sensing elements will be in proper position to obtain the desired nail-to-nail fingerprint images. By way of example, optional feedback as to finger position may be outputted by computer 5 via display monitor 12, such as graphics and/or words, or pictogram. Such display monitor 12 or a different display may be integrated into housing 2 and similarly provide such feedback. Alternatively, feedback may be in the form of computer-generated verbal commands or tones stored in memory of, or accessible to, the processor module 4 or computer 5, using an audio interface and speaker in the housing 2 or computer 5. The finger position detection modules 10a and 10b are connected to processor module 4 for power and communication. For purposes of illustration two modules 10a and 10b are shown in FIG. 1, but one or other number of such modules may be used.

Alternatively, or in addition to finger position detection modules 10a and 10b, continuous images are captured by the flexible sensor 3, and the processor module 4 or computer 5 analyzes the images to determine if the finger 9 is in the correct position, such as by processing one or more images to detect edges in the image (e.g., using grayscale pixel values in the one or more two-dimensional images) associated with proper finger location with respect to sensor 3. In a further alternative, one or more separate imaging systems, such as a digital camera, may be used in system 1 to provide image(s) to processor module 4 and/or computer 5 to determine the finger 9 position, such as by using edge detection.

Optional finger position detection modules 10a and 10b have one or more sensors of an optical beam break system consisting of a light source and at least one detector, or an optical or ultrasonic distance measuring device. For example, modules 10a and 10b may include a series of beam break optical systems where a series of optical sources project light towards detectors. Such optical sources are preferably near IR LEDs with collimation optics and the detectors are preferably lenses PIN photodiodes. If a particular set of light rays are blocked (so the detector does not see them), then the detectors provide finger location information to processor module 4 that finger 9 is present at one location with respect to housing 2. Additional optical rays and detector pairs may be used that are arranged with respect to housing 2 to provide additional location information and thus more resolution with which the location of the finger 9 may be established to assure proper finger 9 placement when mechanism 7 operates. In another example, modules 10a and 10b are a set of optical proximity sensors, such as the Model Number GP2Y0A51SK0F near infrared sensors available from Sharp Electronics Corporation of Japan, which provide finger position information for processor module 4 that can determine the position of the finger. Three of these proximity sensors could be arranged along the x, y, z, axes of housing 2 aligned with flexible sensor 3 in order to determine the x, y, z location of the sides of the finger when presented to or upon sensor 3, enabling the processor module 4 to measure distance (and/or directional vector) of the finger and providing feedback to the subject until optimal position is achieved for presentation to sensor 3. In lieu of an optical proximity sensor, an ultrasonic proximity sensor could be utilized, such as those manufactured by Keyence Corporation of Osaka, Japan.

Additionally, one or more of finger position detection modules 10a and 10b may be a mechanical, electrical, or optical (such as a break beam) switch provided adjacent flexible sensor 3 that the finger 9 activates to indicate to the processor module 4 that the finger has been inserted along housing 9 for presentation to sensor 3. By way of example, the electrical switch may also serve as a mechanical stop, such as the example of a physical opening that the subject's finger is inserted into and its movement into the opening is stopped only once the tip of the finger touches a mechanical stop or an electrical switch, much in the same manner as a finger might press a doorbell. By finger 9 touching this electrical switch, the processor module 4 using a signal from the switch to provide finger position information as an indication that the finger 9 is in the correct position. Thus, means are described above by which finger position information can be acquired by the processor module 4 using image(s) and/or sensors 10a and 10b.

Where the conforming enclosure mechanism 7 operates solely using pressure by finger 9, such as in the case of mechanism 7 of FIGS. 3A-B, or 8A-C, mechanism 7 may optionally be prevented from operation by locking mechanism 38 against the one or more positioning members of mechanism 7, which is released when the processor module 4 has determined that the subject has correctly positioned finger 9. Such locking mechanism 38 is described later in connection FIGS. 3A and 3B, and may be considered part of mechanism 7.

Power is provided to the processor module 4, the conforming enclosure mechanism 7 (if needed), and illumination system 8 and/or finger position detection modules 10a and 10b if provided in system 1, and any other electronic components, either from a battery in housing 2, a cable to housing 2 from a AC power adapter, or a cable from an interface data port along computer 5, such as USB, to an interface data port along housing 2.

Figure 2A:
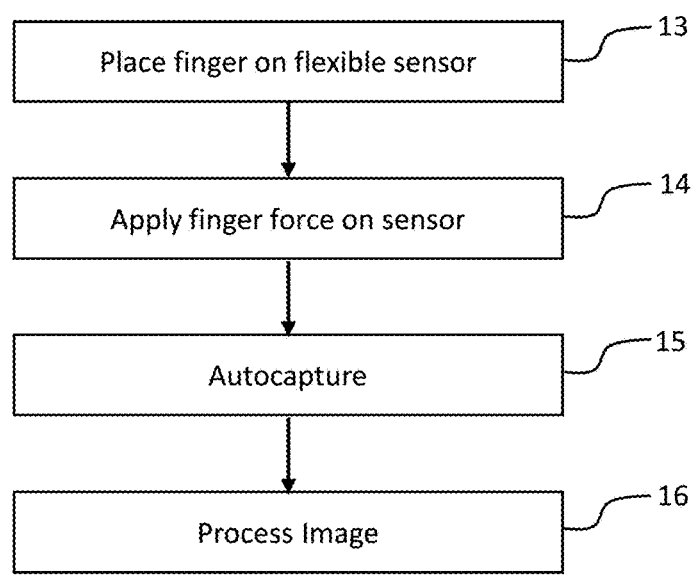
FIG. 2A is a first flowchart illustrating one embodiment of the operation of the system of FIG. 1.

The operation of system 1 is described below is connection with the flowcharts of FIGS. 2A-C. In FIG. 2A, the subject places their finger 9 on the flexible sensor 3 (step 13) and then applies a force onto the sensor 3 to get the sensor to conform to the finger (step 14), such as when using the conforming enclosure mechanism 7 of FIGS. 3A-B, 7A-C, or FIGS. 8A-C, which is operative all in part using pressure of finger 9. The sensor 3 is scanning in an autocapture mode in providing images to processor module 4 (step 15). As described for example in U.S. Pat. No. 7,277,562 to Zyzdryn, which is herein incorporated by reference, a biometric fingerprint scanner may implement software that will continually capture images from the scanner's sensor, all the while analyzing the images to determine if the images represent the number of fingers required and if the quality of the fingerprint meets an application-specific threshold. Once such image quality metrics are met, such image is processed (step 16) to arrive at a final rolled-equivalent fingerprint image of finger 9. Optionally, more than one of the nail-to-nail image from sensor 3 is captured and may be analyzed depending on the desired processing.

Processing at step 16 may include noise reduction, such as that achieved by averaging one or more images, contrast enhancement, such as by convolving the image with a kernel, or converting a more than 8-bit image to an 8-bit image by selecting the 8-bits that results in a fingerprint image of a maximum contrast, with minimal saturation for the high signal and minimal flooring of the bits for the low signal. The particular processing at step 16 of captured images depends upon the noise level of the sensor 3 and its pixel defects as well as depending upon the illumination uniformity, the final image of the fingerprint may be obtained after image processing by processor module 4 and/or computer 5. For example, if the sensor 3 has an undesirable amount of noise, it is preferable to take multiple images at the same illumination level and sensor 3 settings and then to average these images to reduce the temporal noise of the final image. Pixel defects should also be corrected. By way of example, the grayscale signal of each of the good pixels surrounding a dead pixel may be averaged to arrive at a new value to digitally replace the incorrect signal of the dead pixel. Other defect pixel processing may determine the direction of image gradient based upon the grayscale values of the good surrounding pixels, and weight the good pixels accordingly before averaging to obtain a replacement grayscale value for the identified dead pixel.

Image contrast enhancement is another image processing that may be implement at step 16. In this case, a kernel is convolved with the raw image in order to enhance certain spatial frequencies of the image based upon the known MTF characteristics of the system. Flat-field correction may be implemented where the known offset and linearity of each sensor pixel is characterized in order to correct for these effects in real images. If the image of a fingerprint is particularly non-uniform, this may be to low signals in some parts of the fingerprint and high signals at another parts. High dynamic range (HDR) processing may be implemented. There may be situations where capacitively or thermally that multiple images of the same fingerprint need to be taken at different sensor 3 parameters and the resulting stack of images analyzed to determine which image in the stack has the best fingerprint image for each region of the fingerprint image and the resulting best fingerprint image pieces from multiple images merged into a single fingerprint image.

Figure 2B:
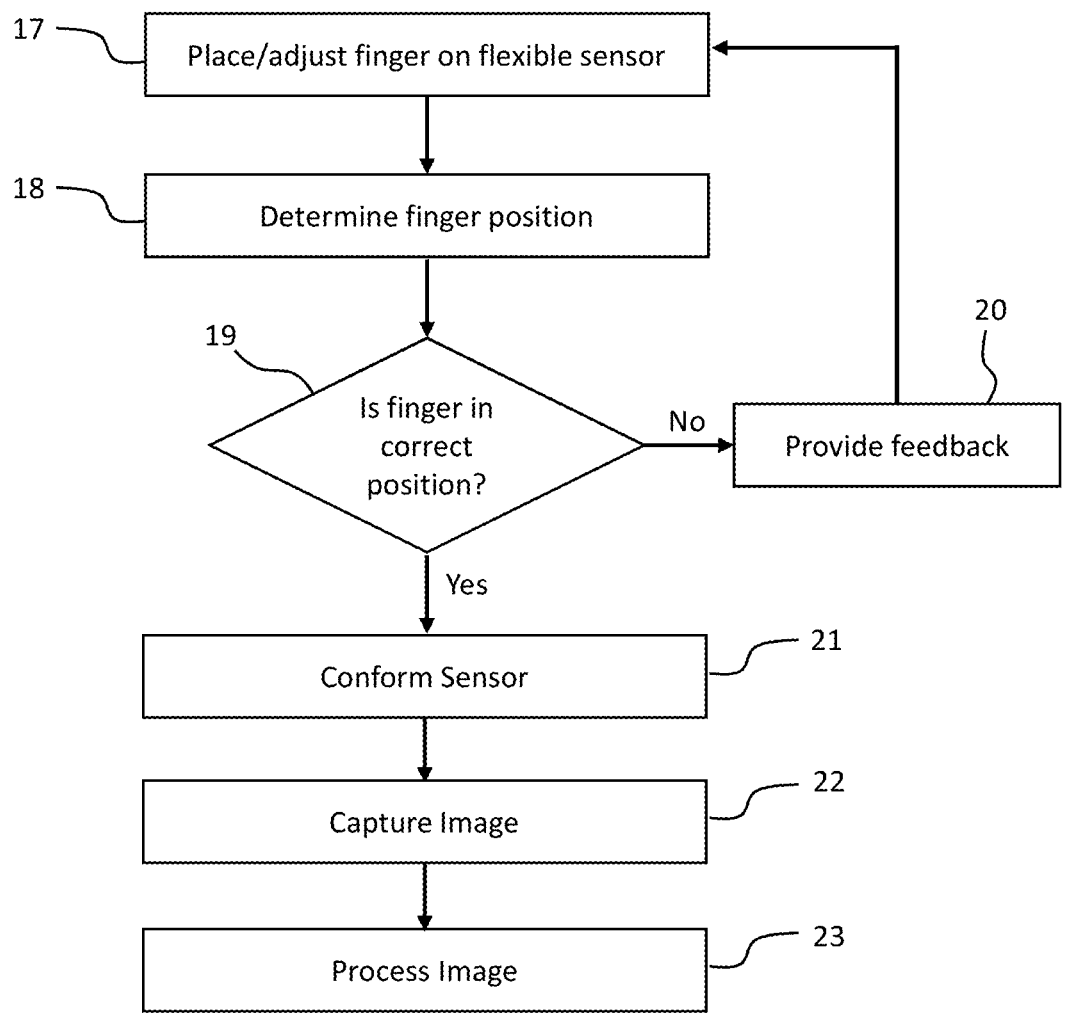
FIG. 2B is a second flowchart illustrating another embodiment of operation of the system of FIG. 1.

In FIG. 2B, a more detailed flowchart of the operation of the system 1 is shown. The subject positions his or her finger 9 on the flexible sensor 3 (step 17), and then the system collects and processes information that determines the finger position (step 18). By way of example, such finger position information may be obtained by having the subject place the desired finger 9 onto the sensor 3 and processor module 4 and/or computer 5 reading and analyzing the image(s) captured from the sensor 3 stored by processor module 4 in its memory, as described earlier. In addition, or alternatively, one or more of optical beam breaks technology, optical distance measurement technology, ultrasonic distance measuring technology or separate optical imaging systems may be used to determine the position of the subject's finger, such as those of finger position detection modules 10a and 10b described earlier. The system 1 via processor module 4 and/or computer 5 analyzes the finger 9 position information and if the finger is not in the correct position (step 19), gives feedback to the subject, as previously described, to move his or her finger into the correct position (step 20) and then steps 17-19 repeat. If the finger 9 is in the correct position at step 19, the sensor 3 is conformed to the finger (step 21). This may be achieved by giving the subject graphical display commands on display monitor 12, and/or voice commands via computer 5 having an audio interface and speaker, to press his/her finger 9 onto the sensor 3, and/or by activating one or more of mechanics, pneumatics, or fluid mechanics to at least partially wrap the sensor around the finger 9 as will be described in connection with different ones of mechanism 7 of FIGS. 3A-B, 5A-B, and 7A-C. Next the processor module 4 captures one or more images from the sensor 3 (step 22), which preferably includes step 15 autocapture mode (FIG. 2A). Once a suitable image or images of the finger 9 is captured, these image(s) are processed in the same manner as described earlier at step 16 of FIG. 2A (step 23) to arrive at a final rolled-equivalent fingerprint image of finger 9.

Figure 2C:
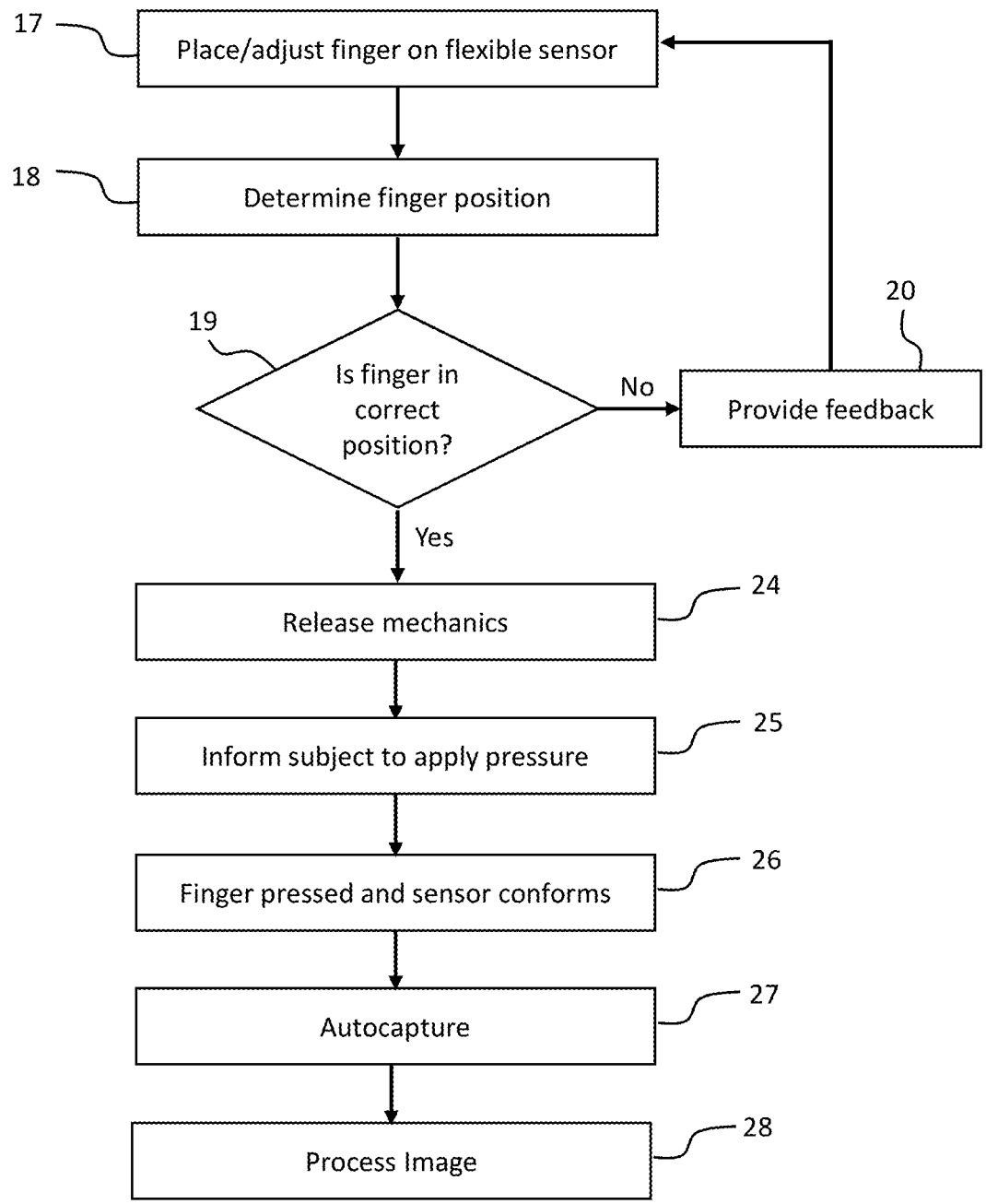
FIG. 2C is a third flowchart illustrating a further embodiment of operation of the system of FIG. 1.

In FIG. 2C, a further flowchart of the operation of the system 1 is shown which adds additional steps prior to conforming flexible sensor 3 to finger 9. As previously described in reference to the flowchart of FIG. 2B, the subject first places his or her finger 9 on the sensor 3 (step 17) and the system 1 processes information that determines the finger position (step 18) using one or more of sensor 3 captured image(s) or information from the finger position modules 10a and 10b, to determine if finger 9 is in the correct position (step 19). If finger 9 is not in the correct position, the subject is informed regarding how finger 9 should be moved to get it into the correct position (step 20) and steps 17-19 repeat. If the finger 9 is in the correct position at step 19 in FIG. 2C, processor module 4 disables locking mechanism 38 thereby releasing mechanism 7 that was preventing the sensor 3 from conforming around the finger 9 (step 24) due to finger 9 pressure upon sensor 3. The subject is then informed by graphical and/or audio commands to apply pressure against the sensor 3 (step 25) which in the case of mechanism 7 of FIGS. 3A-B and 8A-C is sufficient to conform sensor 3 to finger 9. However if additional or other forces, such as a motor driven, hydraulic or pneumatic means, are used to operate mechanism 7, as in the case of mechanism 7 of FIGS. 5A-B, and 7A-C, such are activated by the processor module 4, via conform control module 11 (FIG. 1), in lieu of activating release mechanics at step 24. Thus, forces are applied required for the sensor 3 to conform to the finger 9, or alternatively, or in conjunction alerts the subject with voice or graphical displays commands how to move his or her finger to partially or completely assist the sensor 3 in conforming around the finger 9 (step 26). In one example, the subject is told to continue to apply downward force onto the sensor 3. As described earlier, it is preferable that the system 1 employs an autocapture mode (step 27) in order to capture a high-quality image and ensure that any motion blurred or low-contrast images are not inadvertently captured for input in the final image processing step 28 to arrive at a final rolled-equivalent fingerprint image of finger 9. Steps 27 and 28 may be the same as described earlier at steps 15 and 16 (FIG. 2A), respectively.

Preferably the operation of system 1 when the user is untrained is in accordance with FIG. 2C, which may be considered a two-part operation as summarized below using for example the conforming enclosure mechanism 7 of FIGS. 3A-B operating responsive to finger 9 pressure. The first part is to determine that the finger 9 is in the correct position (steps 17-20), and the second part of the operation is to allow the flexible sensor 3 to conform to the finger once the system 1 determines that the finger 9 is in the correct position and then capture and process (if needed) the image(s) from sensor 3 (steps 24-28). For the first part of the operation, the finger 9 is placed on the flexible sensor 3 where the sensor 3 is in a state where it might be flat or curved, but not wrapping around the finger so as to constrain finger movement. The system 1 captures continuous images from the flexible sensor 3 and analyzes the images to determine if the finger is in the correct position. If it is not, the subject is given feedback to move their finger appropriately, as described earlier. In addition or alternatively, such finger position information may be obtained using finger position detection modules 10a and 10b. Once system 1 determines that the finger is in the correct position, locking mechanism 38 is released and the subject is informed that their finger is in the correct position and that they may proceed by pressing their finger 9 down onto the flexible sensor 3. Because the mechanical lock is released, the part of mechanism 7 under the sensor 3 will give way to the pressure of the finger 9, thereby allowing the finger to travel downward and allowing the sensor 3 to curl and conform around the subject's finger 9. The subject may be informed that they should continue to apply downward pressure for this last step through verbal (words or sound through a speaker in housing 2 of computer 5) or a visual cue that might be via one or more of graphics and words that are presented on a display along housing 2 or display monitor 12. With the sensor 3 now wrapped around some or substantially all of the nail-to-nail region of the finger, the images that the system 1 captures are rolled-equivalent fingerprints without the need for the subject to have rocked or rolled his or her fingers on sensor 3. The system may implement image processing at step 28 to achieve low-noise, high-contrast, good uniformity final images of the subject's nail-to-nail fingerprint.

Referring to FIGS. 3A-B, and 4A-B, a first embodiment of the conforming enclosure mechanism 7 is shown having positioning members provided by two opposing arms 31a and 31b mounted for inwardly rotate towards each other for moving the flexible sensor 3 towards the finger 9 to curl around and conform to finger 9, thereby at least partially enclosing finger 9 at least along a region between the left and right sides of fingernail 9a (preferably nail-to-nail) around the front of the finger. Arm 31a and 31b are rotationally mounted to fixtures 32a and 32b, respectively, by hinges 30a and 30b, respectively, where fixtures 32a and 32b are mounted upon housing 2 (FIG. 1). Arms 31a and 31b each have a first portion providing an extending lower surface 34a and 34b, respectively, supporting a lower portion 3a of sensor 3, and a second portion providing an upper surface 35a and 35b, respectively. Upper surface 35a and 35b extend from mechanical features 33a and 33b, respectively, of arms 31a and 31b, respectively, and are disposed to support two upper portions 3b of sensor 3 along either side of lower portion 3a of sensor 3 as shown in FIG. 3A. Lower surfaces 34a and 34b are each provided by the tops of a set of multiple extending prongs of arms 31a and 31b, respectively, where the prongs associated with each arm interweave and spaced from each other to enable them to move relative to each other when arms 31a and 31b rotate along their respective hinges 30a and 30b in respective fixtures 32a and 32b.

For example, arms 31a and 31b and fixtures 32a and 32b may be of rigid metal or plastic, such as injection molded plastic, and hinges 30a and 30b may be tubes or rods of aluminum or other rigid material. Each the arms 31a and 31b may be rotationally mounted to their respective fixtures 32a and 32b like a typical hinge along a door. Other mechanisms for rotational mounting arms 31a and 31b may be used, with or without hinges 30a and 30b, so long as the arms can rotate as described above between conforming and non-conforming states. Such as for example, each of the arms 31a and 31b being fixed to a shaft having two opposite ends mounted in holes along housing 2 (or a fixture mounted to housing 2) so that the shaft can rotate with respect to housing 2.

Locking mechanism 38 when enabled by processor module 4, via conform control module 11, prevents movement of the one or more positioning members of arms 31a and 31b of mechanism 7 shown in FIGS. 1 and 3A, and when disabled by processor module 4 releases mechanism 7 permitting operation thereof as shown in FIG. 3B. Locking mechanism 38 has a movable fixture of two locking members 38a and 38b which extend upwards to ends 38c and 38d, respectively. As shown in FIGS. 1 and 3A, ends 38c and 38d engage against the lower surfaces of arms 31a and 31b, respectively, preventing their rotation responsive to pressure of finger 9. A solenoid 38e of locking mechanism 38 is mounted to enable movement of the base supporting locking members 38a and 38b between an up, locked, enabled position against arms 31a and 31b to prevent their rotation, as shown in FIGS. 1 and 3A, and a down, released, disabled position, as shown by direction of arrow 39 in FIG. 3B, allowing the pressure of finger 9 to rotate the arms. Processor module 4 can sending signals to solenoid 38e, via conform control module 11 (FIG. 1), to control solenoid 38 and thereby movement of locking members 38a and 38b between enabled and disabled positions. While two locking members 38a and 38b are shown, a single locking member from solenoid 38e may be used which extends against along the underside of at least two of the prongs providing surfaces 34a and 34b of arms 31a and 31b, respectively. Accordingly, the particular locking mechanism 38 illustrated in FIGS. 1, 3A, and 3B represents an example of means for preventing movement of one or more positioning members provided by arms 31a and 31b until the finger 9 is positioned properly upon the sensor 3.

In operation, finger 9 is touching flexible sensor 3 and mechanical arms 31a and 31b extending from fixtures 32a and 32b, respectively, have not moved or moved significantly, as shown in FIG. 3A, as a result of either locking mechanism 38 being in a enabled position, or if already disabled due to finger 9 having so far applied little or minimal force upon sensor 3. As illustrated in FIG. 3B with locking mechanism 38 being disabled to release arms 31a and 31b, increasing force by finger 9, results in arms 31a and 31b deflected downwards as they rotate in their respective fixtures 32a and 32b along respective hinges 30a and 30b. The downward motion of arms 31a and 31b allows their mechanical features 33a and 33b to rotate inward towards finger 9, thereby pressing their respective surface 35a and 35b along upper portions 3b of sensor 3 such that the sensor more fully conforms around the finger 9. Surfaces 34a and 34b of arms 31a and 31b, respectively, may be contoured (slightly concave) as shown in FIG. 3A to facilitate lower portion 3a of the sensor 3 to assist in following the shape of the finger 9 when arms 31a and 31b are sufficiently deflected by the downward force due to the applied pressure of finger 9 against sensor 3. With sensor 3 partially enclosing around finger 9, and sensing elements of the sensor 3 face the region of the finger between right and left sides of a fingernail 9a of the finger, rolled-equivalent fingerprint image(s) from nail-to-nail are captured by sensor 3 and provided to processor module 4.

Figure 4A:
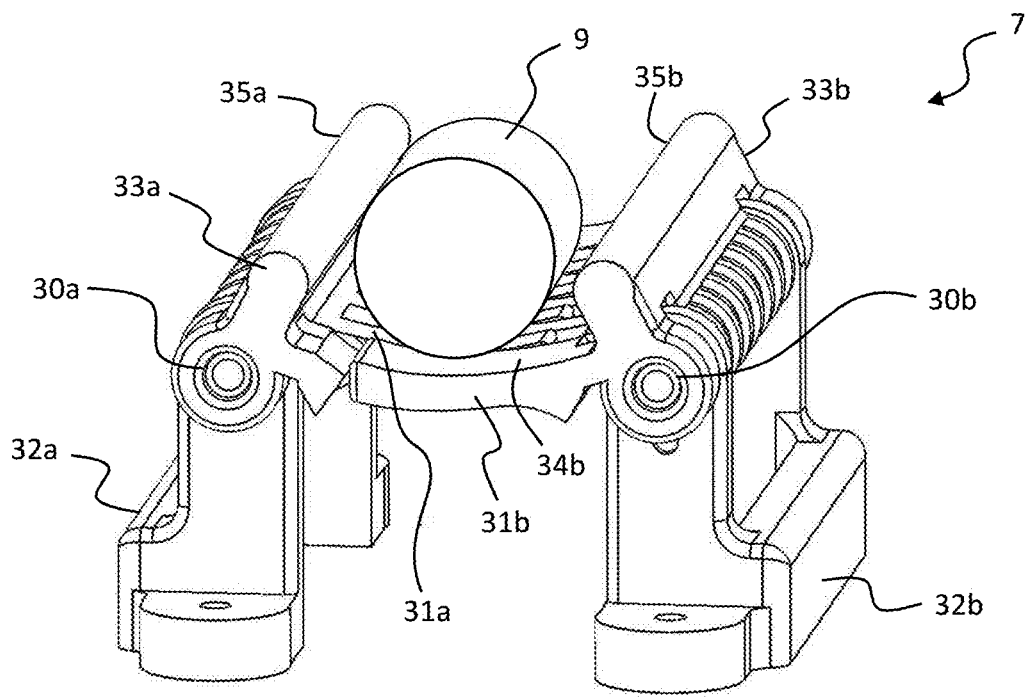
FIGS. 4A and 4B are perspective views of FIGS. 3A and 3B, respectively, in which the flexible sensor is removed, and the finger is depicted by a solid cylinder.
Figure 4B:
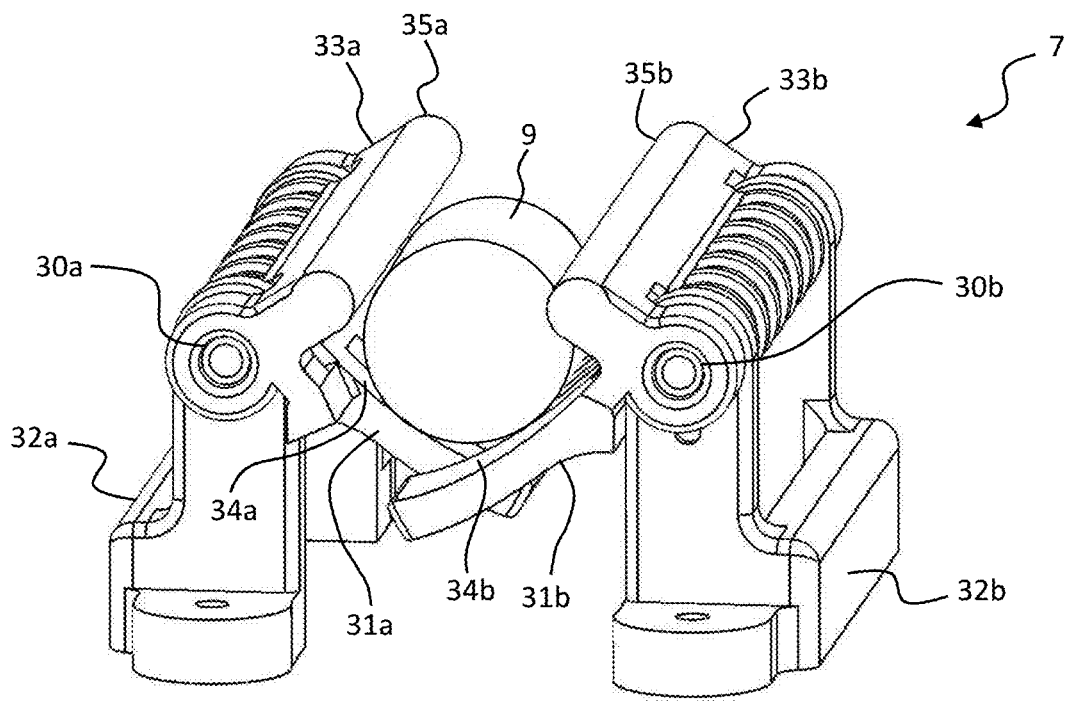

Features 33a and 33b are part of arms 31a and 31b, respectively, and thus rigidly mount to the rest of the arms 31a and 31b, respectively, including surfaces 34a and 34b, respectively, thereof, so that the entire arms 31a and 31b rotate together as shown in FIG. 3B, but features 33a and 33b may also be spring-mounting to their respective arms. The advantage of spring-mounting is that tension can still be kept on the flexible sensor 3 to force the sensor to conform to finger 9, but simultaneously allow some flexibility in the varying the inward travel of features 33a and 33b to accommodate variations in the sizes of a subject's fingers as well as variations in the sizes of fingers from one subject to another. For example, spring mounted hinges may be used to facilitate return rotation of the arms 31a and 31b back to their initial non-conforming position of FIG. 3A from that of finger conforming position of FIG. 3B once finger 9 pressure is removed. The arms 31a and 31b and fixtures 32a and 32b of FIGS. 3A and 3B are shown as perspective views in FIGS. 4A and 4B, respectively, without finger 9 or sensor 3 in order to show more detail of mechanism 7 of this embodiment. For purposes of illustration, a cylinder is depicted in FIGS. 4A and 4B to show the relative position of finger 9.

Thus, in such first embodiment of mechanism 7, a finger 9 is placed onto the flexible sensor 3 and the force of the subject's finger 9 pressing down upon the sensor 3 causes a mechanical support mechanism provided by arms 31a and 31b supporting the sensor 3 to move downward with the force of the finger 9. As the subject's finger 9 moves arms 31a, 31b, and sensor 3 down, portions 3b of the sensor on one or both sides of the sensor begin to wrap around the sensor 3. In this embodiment, the capturing a rolled-equivalent fingerprint may be one continuous motion where the finger 9 is inserted between arms 31a and 31b supporting the sensor 3 and mechanically stops at a correctly position moving the flexible sensor 3 to conform to the subject's finger 9 due to the downward force on the sensor 3 from the finger 9, and then one or more images of a rolled-equivalent fingerprint are electronically captured from sensor 3. While locking mechanism 38 is preferred, mechanism 7 of FIGS. 3A and 3B may operate without such locking mechanism.

Figure 5A:
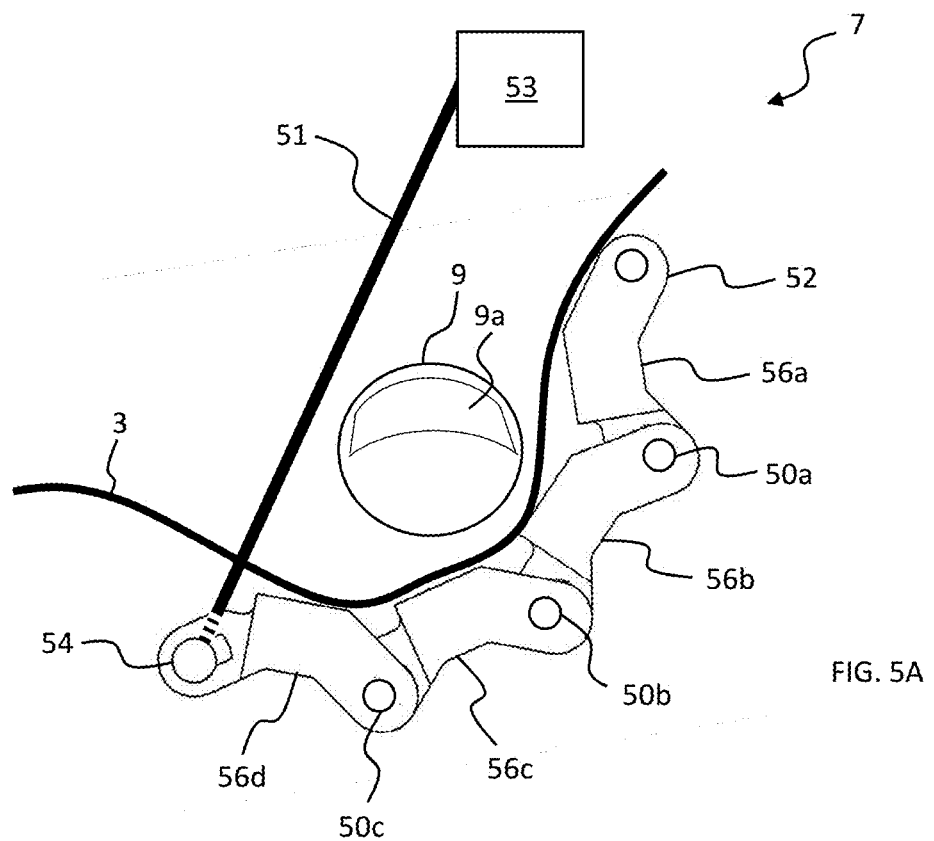
FIGS. 5A and 5B are side views of a mechanism of a second embodiment for positioning an example finger with respect to the flexible sensor in the system of FIG. 1 using a flexible carrier of hinged links, where FIG. 5A show the initial placement of the finger with respect to the mechanism.
Figure 5B:
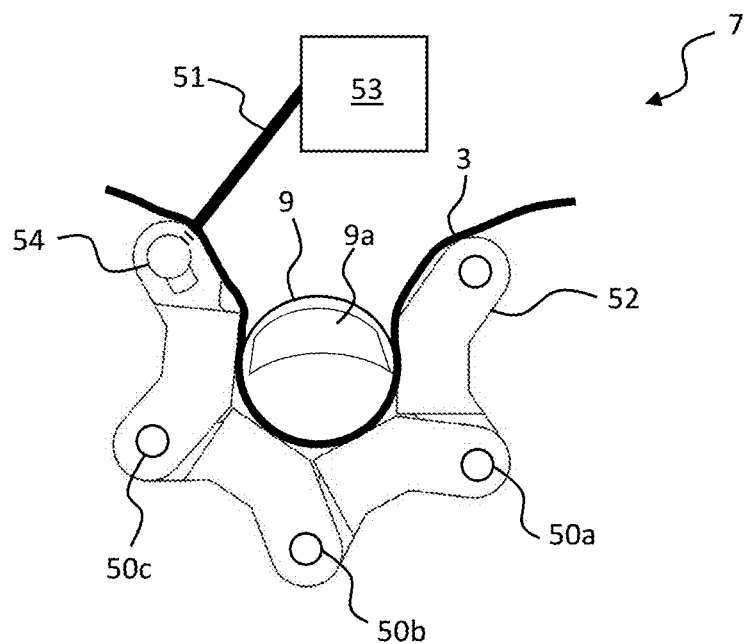

Referring to FIGS. 5A and 5B, a second embodiment of the conforming enclosure mechanism 7 is shown having positioning members provided by a flexible carrier 52 comprising a plurality of hinged links (or carrier members) 56a, 56b, 56c, and 56d which move to partially enclose the flexible sensor 3 around the finger to curl around and conform to finger 9, thereby at least partially enclosing finger 9 at least along a region extending between the left and right sides of fingernail 9a (preferably nail-to-nail) around the front the finger. The sensor 3 is placed on four mechanical links 56a-d that are joined together via three hinges 50a, 50b, and 50c which enables carrier 52 to be flexible. Carrier 52 may comprise of a higher or few number of links and corresponding hinges. At one end of mechanical carrier 52, a cable 51 is attached to carrier 52 at pin 54 that extends from link 56d opposite link 56c. For example, cable 51 may be made of nylon or stainless steel, links 56a-d may be made of rigid metal or plastic, such as injection molded plastic, and hinges 50a-c may be tubes or rods of aluminum or other rigid material. The other end of cable 51 is attached to an actuating motor 53 operating responsive to signals from processor module 4 via conform control module 11 (FIG. 1). As illustrated in FIG. 5A, the finger 9 with fingernail 9a is placed in a proper position upon sensor 3, which may or may not require that the finger 9 is in contact with sensor 3. The correct position of the finger may be determined as described earlier, but once it is determined that finger 9 is in the correct position, motor 53 is operated by processor module 4 to pull on cable 51 resulting in the left side of carrier 52 being pulled up and to the right as illustrated in FIG. 5B. The sensor 3 is thus squeezed against the finger 9 and as shown is touching the nail-to-nail fingerprint region of the finger. While one side is shown pulled, optionally one or both sides of carrier 52 may have pins pulled by cables to motor 53 so that sensor 3 wraps around such region of finger 9. For example, motor 53 may be a bi-directional motor with a rotatable shaft with a spool upon which cable 51 winds to pull cable 51 as shown in FIG. 5B, and unwinds to allow cable 51 to relax and release carrier 52 from finger 9, where such relaxation is due to the force of gravity and/or the force of one or more springs which may be disposed between carrier members 56a-d, or where spring biased hinges 50a-c are provided.

Figure 6A:
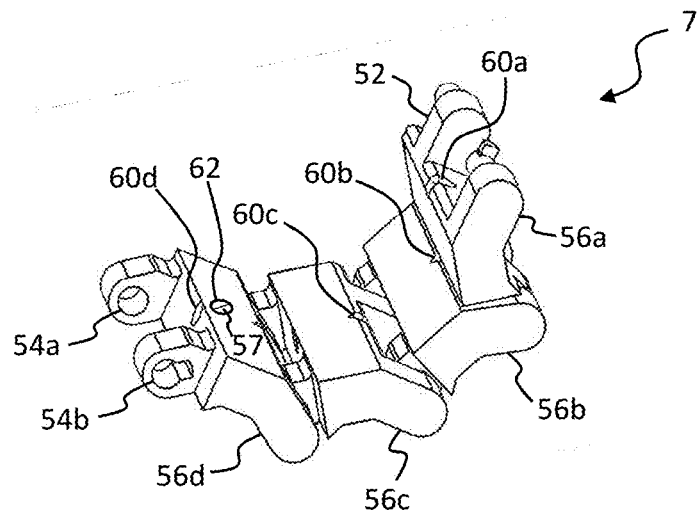
FIGS. 6A and 6B are perspective views of FIGS. 5A and 5B, respectively, with the flexible sensor, finger, and actuating motor removed.
Figure 6B:
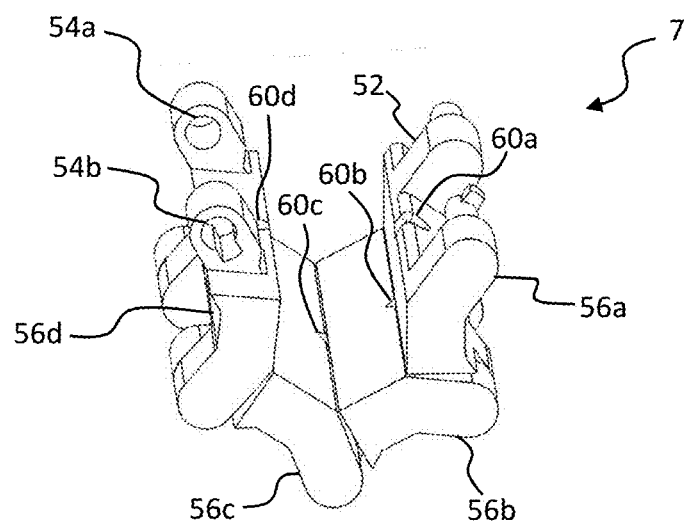

The carrier 52 of FIGS. 5A and 5B are shown as perspective views in FIGS. 6A and 6B, respectively, without finger 9 or flexible sensor 3 in order to show more detail of the mechanism 7. Pin 54 preferably extends through a pair of separate holes 54a and 54b in tabs extending from the end of link 56d as shown in FIGS. 6A and 6B. In this manner, the sensor 3 can be threaded through the gap between each pair of such tabs extending from link 56d, such that the sensor 3 does not interfere with cable 51 that is connected to pin 54. Along the other side of carrier 52, sensor 3 is then threaded through another gap formed between another pair of tabs extending from one end of link 56a opposite link 56b, where such another pair of tabs from link 56a each has a pin, extending parallel with pin 54, which may be optionally mounted for rotation in holes along housing 2. Alternatively, cable 51 may split in a "Y" shape and each half of the "Y" be attached to the ends of pin 54 on the outside of holes 54a and 54b, thereby providing another means of ensuring no mechanical interference between cable 51 and sensor 3 in FIGS. 5A and 5B.

Figure 5C:
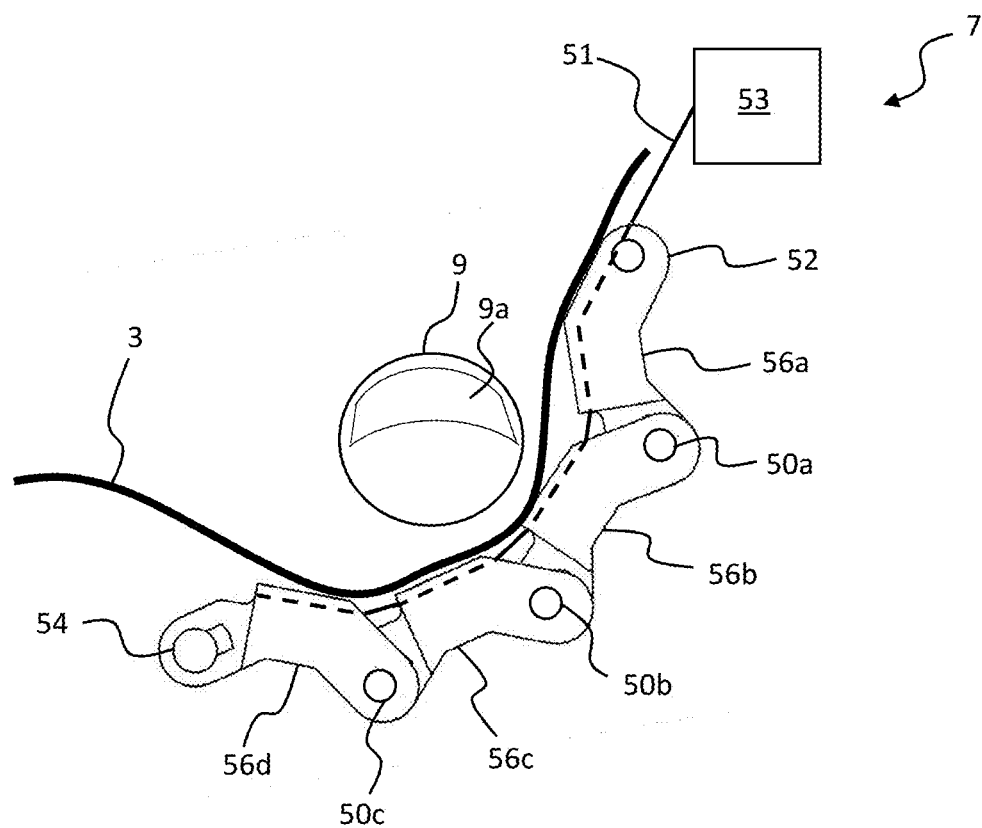
FIGS. 5C and 5D are side views of an alternative mechanism of the second embodiment for positioning an example finger with respect to the flexible sensor in the system of FIG. 1 using a flexible carrier of hinged links with a cable threaded through holes along such links, where FIG. 5C show the initial placement of the finger with respect to the mechanism.
Figure 5D:
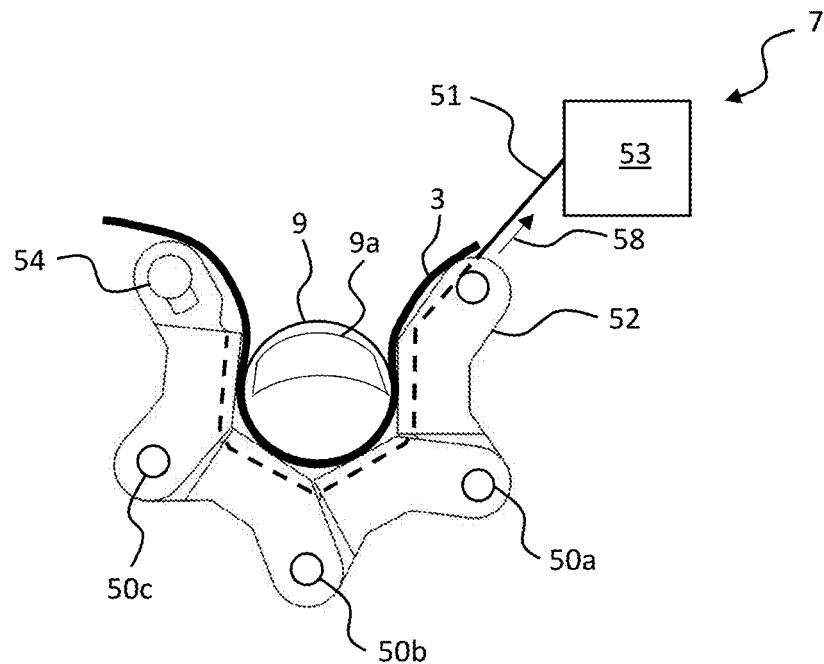

Alternatively, cable 51 represents a cord or ribbon, such as of nylon or other low friction material, that extends through holes 60a, 60b, 60c, and 60d of links 56a-d, respectively, of carrier 52 as shown in FIGS. 5C and 5D, where holes 60a-d are shown in FIGS. 6A and 6B. Motor 53 is coupled to one end of cable 51 extending from hole 60a while the other end is captured in hole 60d by a set screw 57 threaded in a hole 62 to hole 60d. Pin 54 and structures along carrier 52 supporting pin 54 are thus not needed. As illustrated in FIG. 5C, the finger 9 with fingernail 9a is placed in a proper position upon flexible sensor 3, which may or may not require that the finger 9 is in contact with sensor 3. The correct position of the finger may be determined as described earlier, but once it is determined that finger 9 is in the correct position, motor 53, is operated by processor module 4 to pull on cable 51 extended through holes 60a-d resulting in the left side of carrier 52 being pulled up and to the right as illustrated in FIG. 5D.

The operation of system 1 using this second embodiment of the mechanism 7 is preferably the same as described earlier in connection with FIG. 2C, except steps 24-25 are not performed as force of pressure of finger 9 is not needed for operation of mechanism 7 and no locking mechanism is present, rather operation of motor 53 is enabled to conform the flexible sensor 3 to the shape of the finger 9 at step 26 prior to performing steps 27 and 28 as shown for example in FIG. 5B or 5D. After one or more rolled equivalent fingerprint images are captured, motor 53 is reversed from the conforming state of FIG. 5B or 5D to return back to the non-conforming state of FIG. 5A or 5C, respectively. As stated earlier, the return back to the non-conforming state may be achieved using the force of gravity or through the use of spring return forces, where springs may be mounted in between the carrier members 56a through 56d, or spring biased hinges 50a-c are provided.

Figure 7A:
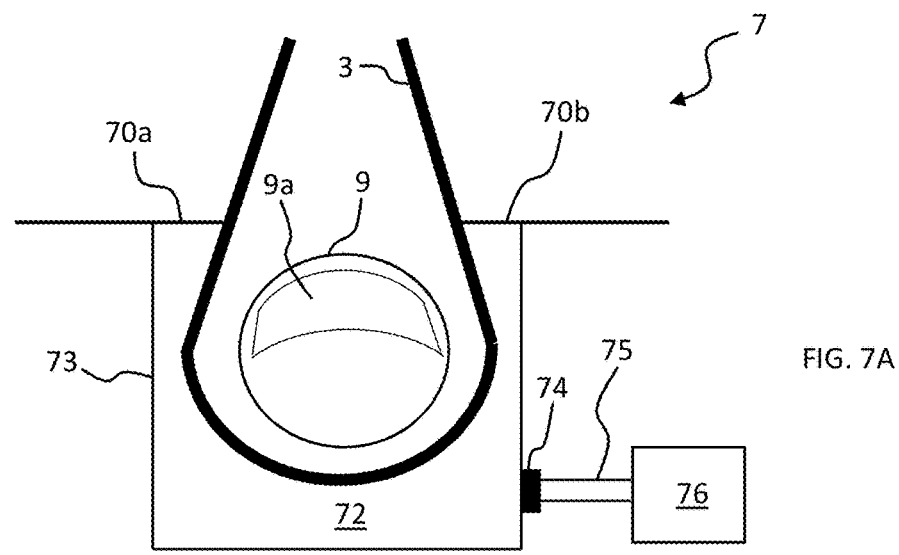
FIGS. 7A, 7B, and 7C are block diagrams of a mechanism of a third embodiment for positioning an example finger with respect to the flexible sensor in the system of FIG. 1 using an expandable bladder, where FIG. 7A show the initial placement of the finger with respect to the mechanism, FIG. 7B show the mechanism moving the sensor into a position with movement of the finger downward.
Figure 7B:
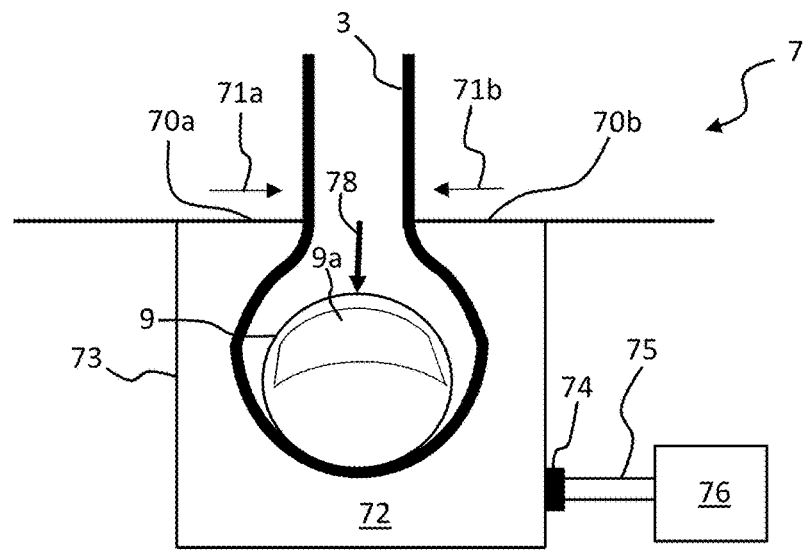
Figure 7C:
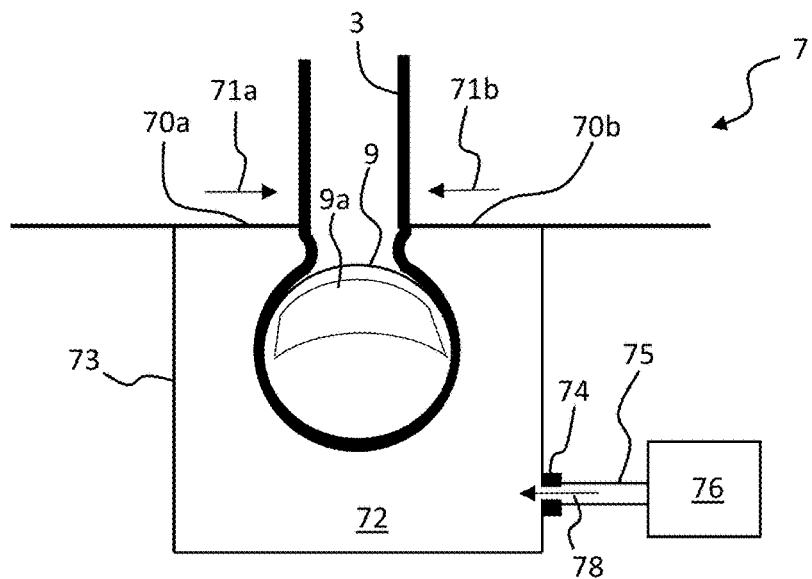

Referring to FIGS. 7A, 7B, and 7C, a third embodiment of the conforming enclosure mechanism 7 is shown having a positioning member provided an expandable chamber or bladder 72 which when expanded moves to partially enclose the flexible sensor 3 around the finger to curl around and conform to finger 9, thereby at least partially enclosing finger 9 at least along a region between the left and right sides of fingernail 9a (preferably nail-to-nail) along a front of the finger. Unlike the first and second embodiments of mechanism 7, both the pressure of the finger 9 upon sensor 3 and the force applied by mechanism 7 itself allows the sensor 3 to curl around and conform to the finger. In FIG. 7A, finger 9 with fingernail 9a is inserted above sensor 3 within the channel of chamber 72. Alternatively, finger 9 may be touching flexible sensor 3. Flexible sensor 3 makes up one side of a chamber 72 with an enclosure 73 and side supports 70a and 70b completing the housing of chamber 72. Within chamber 72 is a medium, such as gas (e.g., air), or a liquid (e.g., water). A pipe 75 connects to chamber 72, via a valve 74, to a pump 76. Valve 74 controls the amount of gas or liquid that moves in expanding chamber 72 or out compressing chamber 72 depending on the direction of pump 76 operation with respect to ambient air (or a reservoir of media available to pump 76 for pumping, and then for storing such media when pumped out of chamber 72 sufficient to return mechanism 7 to a non-conforming state). In this manner, pneumatic or hydraulic operation of mechanism 7 of this embodiment is achieved. Such pump 76 and valve 74 operate responsive to processor module 4 via conform control module 11 (FIG. 1).

In FIG. 7B, the side supports 70a and 70b can move in directions 71a and 71b, respectively, so that the separation of the two side supports is now smaller than the width of the finger 9. The separation of the two side supports 70a and 70b could be set by having the width of the finger 9 measured by analyzing images obtained with a calibrated machine vision camera, but it is preferential for the simplicity, the separation of side supports 70a and 70b be set to a distance that ensures that the distance is smaller than the width of a the smallest finger envisioned to be scanned. Between the temporal events represented in FIG. 7A and FIG. 7B, processor module 4 has determined that finger 9 is in the correct position, as described earlier, and if needed provides finger position feedback (as described earlier) to the subject to move finger 9 to a correct position so that when sensor 3 conforms to the shape of the finger desired nail-to-nail fingerprint image(s) will be captured. Once determining the finger 9 is in position, processor module 4 outputs commands (audio or video cues similar to finger position feedback) to the subject that he or she presses finger 9 down in the direction indicated by arrow 78 so that it is now pressing against sensor 3. Then in FIG. 7B, the side supports 70a and 70b are moved in by the force of finger 9 pressing down upon sensor 3 due to the deformable nature of the chamber 72 prior to expansion. Next in FIG. 7C, valve 74 opens up and the medium, such as air or liquid, whichever is being used in chamber 72, is pumped into the chamber by pump 76, thereby applying pressure to the sensor 3 from the backside, allowing sensor 3 to conform fully around finger 9. As illustrated in FIG. 7C, the sensor 3 is now able to capture an image of the finger spanning more than just the nail-to-nail fingerprint region of the finger 9 if needed.

As shown in FIG. 7A, the sides of flexible sensor 3 extending from enclosure 73 are each angled inwardly in order to assist in pulling in side supports 70a and 70b when finger 9 pressure is applied upon sensor as shown in FIG. 7B. Alternatively, such sides of sensor 3 in FIG. 7A may extend vertically from enclosure 73, rather than angled inwardly, and side supports 70a and 70b are pulled towards each other mainly by the pressurization of chamber 72 when expanded. While application of finger 9 pressure is preferred, after finger 9 is received and in proper positioned in enclosure 73 with respect to sensor 3, chamber 72 may be expanded to conform sensor 3 to finger 9 without first requiring finger pressure upon the sensor by the subject.

The operation of system 1 using this third embodiment of the mechanism 7 is preferably the same as described earlier in connection with FIG. 2C, except step 24 is not performed as no locking mechanism is present, and step 26 is enable by both finger pressure and expansion of chamber 72 (or solely expansion) to conform the sensor 3 to the shape of the finger 9 at step 26 prior to performing steps 27 and 28. After rolled equivalent fingerprint image(s) are captured, the expanding medium is removed from chamber 72 to reverse (valve 74 open and pumped in opposite direction of arrow 78) from the conforming state of FIG. 7C to return back to the non-conforming state of FIG. 7A. Chamber 72 upon which sensor 3 is disposed may be made of an elastomer material allowing for expansion shown in FIG. 7C, deformation of FIG. 7B, and contraction back to FIG. 7A. Thus, multiple embodiments of the conforming enclosure mechanism 7 have been described providing means in system 1 for conforming finger 9 to the shape of sensor 3, and thereby enabling desired rolled-equivalent fingerprint images without need for a trained operator.

When flexible sensor 3 has optical sensing elements, the light source may be ambient light, or optional illumination system 8 may be integrated in housing 2, or a combination of artificial light from system 9 and ambient light, may be used to illuminate the finger sufficient for proper performance of sensor 3. As stated earlier, when illumination system 8 is provided it preferably provides light sources at least some wavelengths that human tissue is substantially transparent to such as near infrared light, for example one or more wavelengths in the 750 to 950 nm spectral region. The light from these light sources may be transmitted through the finger, where transparency of human tissue to the wavelengths of the light sources is high, such that good quality fingerprint may be achieved from sensor 3. However, for cases where the illumination source combined with the transparency and scatter properties of the human skin may result in non-uniformly illuminated fingerprint images, multiple images may be required where between each or between sets of captured images, the integration time of the sensor 3, the optical power of the illumination source(s), or both are varied. The processor module 4 and/or computer 5 may perform image processing to analyze different images captured, determine in which regions of each image is there acceptable contrast of the fingerprint image, and then to stitch these regions from each image or image set together in order to arrive at a final complete image of a rolled-equivalent fingerprint image. This method may be similar to high-dynamic range (HDR) photography where, by way of example, a camera is placed on a tripod and multiple images of the room are taken, each with a different exposure setting. Through software, such as Adobe Photoshop, the regions of the room that have the appropriate perceived lighting are pieced together from all the images taken, thereby allowing dark areas of the room such as underneath a desk or in a corner of the room appear to have approximately the same illumination level as a region of the room that is close to a window. Multiple images at different sensor 3 integration times and/or illumination power may be required for cases where the illumination wavelengths used by the sensor 3 are at least partially absorbed. For example, since the thickness of the little finger is much smaller than that of a thumb, even for the same person, more light will transmit through the little finger than the thumb and therefore multiple images from sensor 3 may have to be taken in order for processor module 4 to determine the correct sensor 3 and illumination system 8 settings by to achieve the proper image of the fingerprint for a particular finger 9.

As stated earlier, optional illumination system 8 (FIG. 1) may be connected to processor module 4 in the case of flexible sensor 3 that relies at least partly upon optical illumination to produce an image of the scanned finger. In such case, the sensor 3 has optical sensing elements. The light sources of illumination system 8 are disposed with respect to sensor 3 so that it disposed along the top of the finger when a fingerprint image is captured by sensor 3. Thus, finger 9 is positioned between the illumination system 8 and the sensor 3 to enable light from the sources of illumination system 8 to transmit through the finger 9 toward the sensor 3 to illuminate the finger.

Figure 8A:
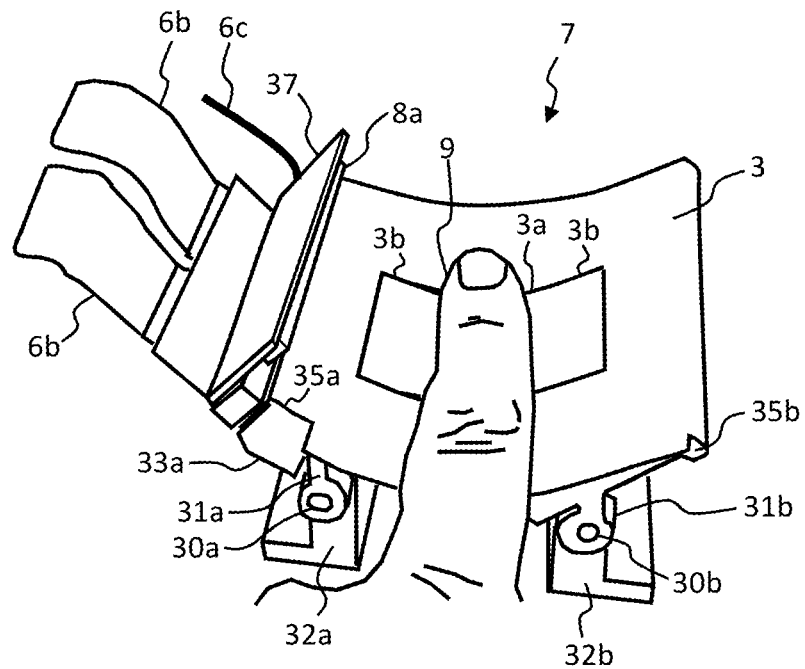
FIGS. 8A, 8B, and 8C are perspective views of an implementation of the mechanism of the first embodiment of FIGS. 3A and 3B with the flexible sensor operative by optically sensing a fingerprint for an example finger, and light sources for illuminating the finger when the fingerprint is captured, where FIG. 8A show the initial placement of the finger with respect to the mechanism, FIG. 8B show the mechanism moving the sensor into a position with movement of the finger downward.
Figure 8B:
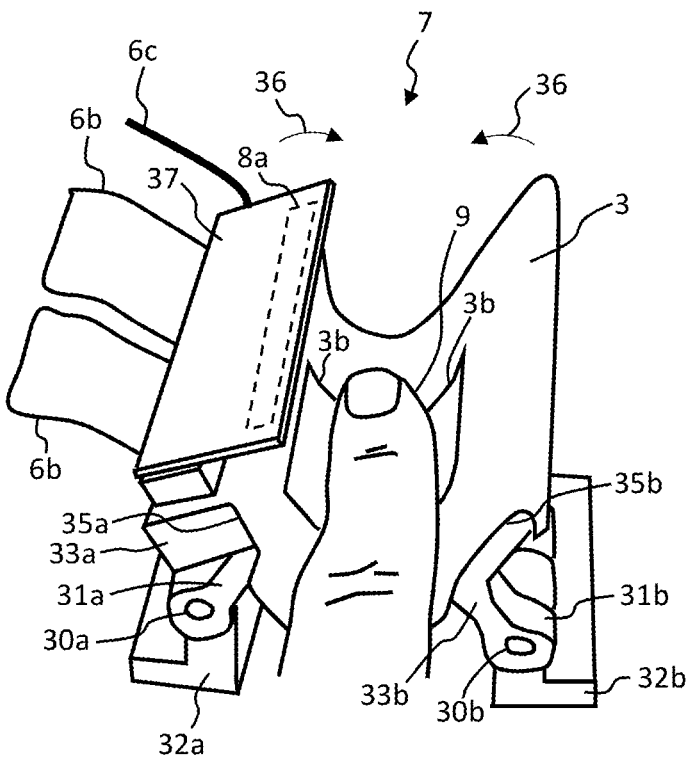
Figure 8C:
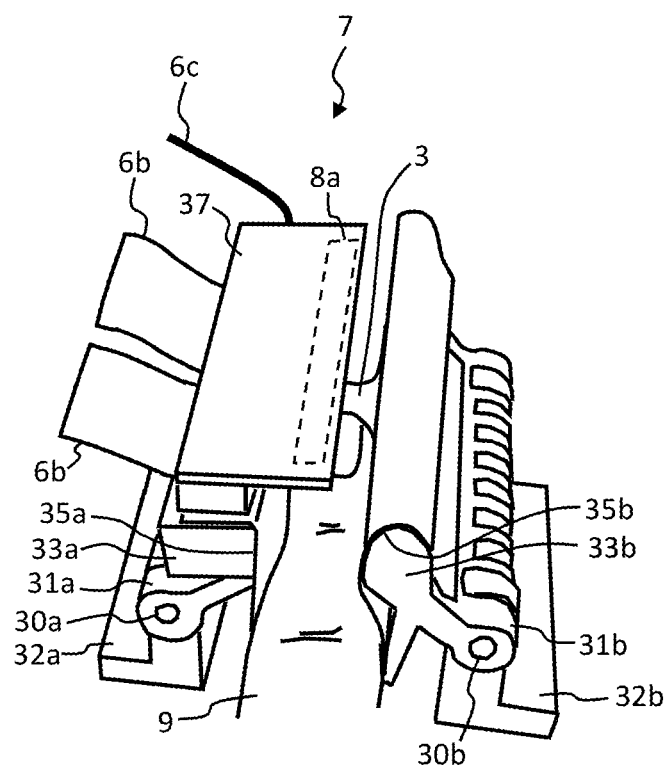

An example of mechanism 7 of the first embodiment with illumination system 8 is shown in FIGS. 8A-C, and arms 31a and 31b of mechanism 7 operate in the same manner as described earlier in connection with FIGS. 3A-B in conforming the shape of flexible sensor 3 to finger 9. In this example, sensor 3 is a 500 ppi optical TFT sensor printed onto a flexible polymer backplane and manufactured by ISORG of Grenoble, France. The illumination system 8 is shown as a printed circuit board 37 mounted along the top of arm 31a with light sources 8a, such as LEDs, along the underside of the board. Finger 9 as illustrated in FIG. 8A is just starting to press onto the sensor 3 and as a result, the sensor is slightly curved. The active area of sensing elements of the sensor 3 is the rectangular area of the sensor 3 that finger 9 is approximately centered on. Such rectangular area includes the earlier described lower portion 3a of sensor 3 upon which the finger 9 is all or at least substantially upon, and upper portions 3b of sensor 3 which are not yet presented to finger 9.

In FIG. 8B, the arms 31a and 31b rotate inwardly towards each other, as depicted by arrows 36, under the pressure of finger 9 and flexible sensor 3 bends and begins to better conform around finger 9. If present, locking mechanism 38 (FIGS. 1, and 3A-B) is first released by processor module 4 to enable such inward rotation of arms 31a and 31b. In FIG. 8C, arms 31a and 31b have reached the limit of their travel and the sensor 3 is now fully conforming being curled around the subject's finger 9. In reaching the end of its travel, in addition to swinging arm 31a down as far as it will go to allow the sensor 3 to conform to finger 9, the other end of the arm 31a that is at the opposite side of the hinge 30a has swung up bring an illumination printed circuit board 37 up and over finger 9. On the side of the illumination printed circuit board 37, light sources 8a, such as 850 nm LEDs, linearly mounted to printed circuit board 37 face downward towards finger 9, such as above at least sensor portion 3a. These light sources 8a are now able to illuminate the top of the finger 9 and radiate and scatter through the finger 9 to the fingerprint side of the finger 9. Where this transmitted and scattered near infrared (NIR) light exits at the fingerprint ridges which are in direct contact with the optical TFT sensor 3, the optical sensor pixels register a strong signal. Where the fingerprint valleys are directly above other pixels of the optical TFT sensor 3, little light is detected and these regions appear dark in the raw image coming from the sensor 3. A representative nail-to-nail fingerprint image captured with by the sensor 3 of FIG. 8C is shown in FIG. 9A. For this image, the grayscale of the original image obtained from sensor 3 was reversed. Although the raw image of the sensor 3 gives dark areas that correspond to fingerprint valleys and pores, the image of FIG. 9A was processed such that the fingerprint valleys and pores are now bright with the fingerprint valleys being dark. FIG. 9B is a magnified view of the upper left portion of the fingerprint image of FIG. 9A.

As stated earlier, the one or more light sources of illumination system 8 may alternatively be provided below, rather than above the flexible sensor 3 and finger 9, in which at least a portion of the light can pass through the sensor 3 to the finger 9. In such case, the entire arms 31a and 31b or at least such portion supporting the active area of sensor 3 are made of material all or at least partially transmissive to such light.

Although the ends of the flexible sensor 3 depicted in FIGS. 1, 3A-B, 5A-C, 7A-C, and 8A-C have not been illustrated as being mechanically secured, these may be secured in place, but then also allow sufficient slack or at least movement via springs such that the sensor 3 can conform to the subject's finger as well as to relax into a position to accept another finger 9 after a first finger has been scanned by system 1. In each case of the different ones of the conforming enclosure mechanism 7 of FIGS. 1, 3A-B, 5A-C, 7A-C, and 8A-C, at least a portion of the one or more positioning members, such as for example, features 33a and 33b of arms 31a and 31b, respectively, at least carrier member 56d or 56a of flexible carrier 52, or portions of bladder 72 facing the right and left sides of fingernail 9a, upon which the sensor 3 is disposed move in a direction toward finger 9 after presentation of the finger to the sensor 3 in order to achieve the desired conforming of the sensor 3 to the shape of the finger due to the flexibility provided by sensor 3.

Although the system 1 is shown operating upon a single finger 9, system 1 may be incorporated in an apparatus operating on one or multiple fingers, including thumbs, of the right and/or left hand of a subject, where each system 1 may be duplicated and placed side by side at an angle to each consistent with the angular spread required of a person's finger in order to place individual fingers 9 onto its own flexible sensor 3 and conforming enclosure mechanism 7 with any associated finger positioning detection modules 10a and 10b. In this manner, two or more fingers may have their nail-to-nail fingerprints imaged at once, i.e., at, or approximately at, the same time.

Variations and modifications in the system, apparatus, and method for acquiring rolled-equivalent finger images illustrated herein will undoubtedly become apparent to those skilled in the art. Accordingly the above description should be taken as illustrative and not in a limiting sense.

The invention claimed is:

1. A system for biometric detection of a fingerprint comprising:
    a flexible sensor; and
    one or more positioning members that move at least a portion of said sensor to conform to a shape of a finger in order to dispose said finger along said sensor to enable capture of a rolled-equivalent fingerprint for said finger using said sensor.

2. The system according to claim 1 wherein said sensor comprises a two-dimensional array of sensing elements operable for capturing one or more images of said rolled-equivalent fingerprint.

3. The system according to claim 1 wherein said one or more positioning members move at least a portion of said sensor to curl said sensor along the finger between right and left sides of a fingernail of the finger to partially enclose the sensor around the finger in order to enable said sensor to capture said rolled-equivalent fingerprint without rotation or rocking of said finger with respect to said flexible sensor.

4. The system according to claim 3 wherein said one or more positioning members comprise one of opposing arms which inwardly rotate the flexible sensor towards the finger between the arms, a flexible carrier which moves to partially enclose the sensor around the finger, or an expandable bladder which moves to partially enclose the sensor around the finger.

5. The system according to claim 1 wherein said one or more positioning members comprise two inwardly rotating arms moveable towards the finger, each of said arms curling an upper portion of said sensor along one of two different sides of a lower portion of said sensor responsive to downward motion of the finger upon said lower portion of said sensor, to dispose said sensor along at least a region between right and left sides of a fingernail of the finger in order to enable said sensor to capture said rolled-equivalent fingerprint.

6. The system according to claim 1 wherein said one or more positioning members comprise a flexible carrier having a plurality of hinged links that move said sensor to curl along the finger to dispose said sensor along at least a region between right and left sides of a fingernail of the finger in order to enable said sensor to capture said rolled-equivalent fingerprint.

7. The system according to claim 1 wherein said one or more positioning members comprise a bladder expandable along said sensor that moves said sensor to curl along the finger to dispose said sensor along at least a region between right and left sides of a fingernail of the finger in order to enable said sensor to capture said rolled-equivalent fingerprint.

8. The system according to claim 7 wherein said bladder is hydraulically or pneumatically expandable.

9. The system according to claim 1 further comprising one or more processors to control said sensor for capturing one or more images of the finger.

10. The system according to claim 9 wherein said one or more processors capture one or more images from said sensor prior to conforming said sensor to said finger to obtain finger location information for determining when said finger is positioned properly with respect to said sensor for capture of said rolled-equivalent fingerprint.

11. The system according to claim 10 wherein one or more locking members operate responsive to said one or more processors to engage said one or more positioning members to prevent movement of said one or more positioning members, and to release said one or more positioning members and enable operation thereof when said finger is determined to be positioned properly with respect to said sensor.

12. The system according to claim 9 further comprising one or more finger position sensors providing finger location information to said one or more processors to determine when said finger is positioned properly with respect to said sensor prior to operation of said sensor to capture said rolled-equivalent fingerprint.

13. The system according to claim 12 wherein one or more locking members operate responsive to said one or more processors to engage said one more positioning members to prevent movement of said one or more positioning members, and to release said one or more positioning members and enable operation thereof when said finger is determined to be positioned properly with respect to said sensor.

14. The system according to claim 1 wherein said fingerprint captured by said sensor is more than the width captured by pressing the finger onto a flat and rigid sensor platen.

15. The system according to claim 1 wherein at least a portion of said one or more positioning members moves in a direction toward the finger after presentation of said finger to said sensor.

16. The system according to claim 1 wherein said sensor comprises optical sensing elements operable for capturing said rolled-equivalent fingerprint, and said system further comprises one or more light sources to illuminate the finger when said sensor captures said fingerprint.

17. The system according to claim 1 wherein said sensor comprises sensing elements operable for capturing said rolled-equivalent fingerprint, and said sensing elements are sensitive to one or more of optical, heat, pressure, capacitive, resistive, or impedance signals measured from the finger that is touching or facing the sensor.

18. A method for biometric detection of a fingerprint comprising the steps of:
    positioning one or more members to move at least a portion of a flexible sensor to conform to a shape of a finger; and capturing a rolled-equivalent fingerprint for said finger using said sensor.

19. The method according to claim 18 wherein said positioning step further comprises the step of positioning said one or more members to curl said sensor along the finger in order to dispose said sensor along at least a region extending to, or proximate to, right and left sides of a fingernail of the finger around a front of the finger in order to conform said sensor to the shape of the finger along at least said region when said capturing step is carried out.

20. The method according to claim 18 further comprising the step of sensing position of said finger to determine when said finger is positioned properly with respect to said sensor for carrying out said capturing step.

21. The method according to claim 20 further comprising the step of preventing operation of said positioning step until said step of sensing position of said finger has determined that said finger is positioned properly with respect to said sensor for carrying out said capturing step.

22. The method according to claim 18 wherein said one or more members of said positioning step comprises one of opposing arms which inwardly rotate the sensor towards the finger between the arms, a flexible carrier which moves to partially enclose the sensor around the finger, or an expandable bladder which moves to partially enclose the sensor around the finger.

23. The method according to claim 18 wherein said at least a portion of said one or more members of said positioning step move in a direction toward the finger after presentation of said finger to said sensor.

24. The method according to claim 18 further comprising the step of illuminating the finger when said capturing step is carried out.

25. An apparatus for biometric detection of a fingerprint comprising:
a flexible sensor;
means for positioning the sensor to conform to the shape of a finger along at least a region extending to, or proximate to, right and left sides of a fingernail of the finger around a front of the finger; and
one or more processors to control the sensor to capture one or more images of a fingerprint of the finger along said region where the fingerprint is more than the width captured by pressing the finger onto a flat and rigid sensor platen.

26. The apparatus according to claim 25 wherein said one or more images captured represent a rolled-equivalent fingerprint for said finger.

27. The apparatus according to claim 25 wherein said means comprise one of: opposing arms which inwardly rotate the flexible sensor towards the finger between the arms, a flexible carrier which moves to partially enclose the sensor around the finger, and an expandable bladder which moves to partially enclose the sensor around the finger.

28. The apparatus according to claim 25 wherein said sensor comprises a two-dimensional array of sensing elements operable for capturing said one or more images of said fingerprint.

29. The apparatus according to claim 28 wherein said sensing elements are optical sensing elements, and said apparatus further comprises one or more light sources to illuminate the finger when said sensor captures said one or more images.

30. The apparatus according to claim 25 further comprising means for providing finger location information to said one or more processors to determine when said finger is positioned properly with respect to said sensor prior to operation of said sensor to capture said one or more images.

31. The apparatus according to claim 30 further comprising means for preventing movement of said one more positioning members until said finger is positioned properly to said sensor.

* * * * *